United States Patent
Aker et al.

(10) Patent No.: US 7,068,212 B2
(45) Date of Patent: *Jun. 27, 2006

(54) DOPPLER COMPLEX FFT POLICE RADAR WITH DIRECTION SENSING CAPABILITY

(75) Inventors: John L. Aker, Kansas City, MO (US); Robert S. Gammenthaler, Princeton, TX (US)

(73) Assignee: Applied Concepts, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,056

(22) Filed: Nov. 10, 2003

(65) Prior Publication Data

US 2004/0257268 A1    Dec. 23, 2004

Related U.S. Application Data

(63) Continuation of application No. 10/005,553, filed on Nov. 7, 2001, now Pat. No. 6,646,591, which is a continuation of application No. 09/690,179, filed on Oct. 16, 2000, now abandoned, which is a continuation of application No. 09/120,542, filed on Jul. 21, 1998, now Pat. No. 6,198,427.

(51) Int. Cl.
G01S 13/58    (2006.01)
G01S 13/00    (2006.01)

(52) U.S. Cl. ................. 342/114; 342/104; 342/115; 342/147; 342/192; 342/194; 342/195; 342/196

(58) Field of Classification Search ............... 342/104, 342/105, 107, 109, 113–115, 118, 127, 133, 342/146, 147, 175, 192–197; 375/222; 340/939
See application file for complete search history.

(56) References Cited

U.S. PATENT DOCUMENTS

| | | | | |
|---|---|---|---|---|
| 3,438,031 A | * | 4/1969 | Fathauer | 342/92 |
| 3,689,921 A | * | 9/1972 | Berry | 342/115 |
| 3,870,990 A | * | 3/1975 | Fathauer | 340/939 |
| 3,899,772 A | * | 8/1975 | Mead et al. | 375/222 |
| 3,936,824 A | * | 2/1976 | Aker et al. | 342/115 |
| 4,020,490 A | * | 4/1977 | Millard | 342/115 |

(Continued)

OTHER PUBLICATIONS

Craig Peterson, "Speed Enforcement Technology", Law and Order, vol. 41, No. 9, Sep. 1993, pp. 32-41.

(Continued)

*Primary Examiner*—Bernarr E. Gregory
(74) *Attorney, Agent, or Firm*—Scott T. Griggs; Griggs Bergen LLP

(57) ABSTRACT

A series of police Doppler single mode radars and a multi-mode police Doppler radar, all with direction sensing capability are disclosed. A quadrature front end which mixes received RF with a local oscillator to generate two channels of Doppler signals, one channel being shifted by an integer multiple of 90 degrees in phase relative to the other by shifting either the RF or the local oscillator signal being fed to one mixer but not the other. The two Doppler signals are digitized and the samples are processed by a digital signal processor programmed to find one or more selected target speeds. Single modes disclosed are: stationary strongest target; stationary, fastest target; stationary, strongest and fastest targets; moving, strongest, opposite lane; moving, strongest, same lane; moving, fastest, opposite lane; moving, fastest and strongest, opposite lane; moving, fastest, same lane; moving fastest and strongest, same lane.

12 Claims, 37 Drawing Sheets

U.S. PATENT DOCUMENTS

| | | | | |
|---|---|---|---|---|
| RE29,401 | E * | 9/1977 | Aker et al. | 342/115 |
| 4,052,722 | A * | 10/1977 | Millard | 342/115 |
| 4,214,243 | A * | 7/1980 | Patterson | 342/115 |
| 4,219,878 | A * | 8/1980 | Goodson et al. | 342/115 |
| 4,236,140 | A * | 11/1980 | Aker et al. | 342/115 |
| 4,293,859 | A * | 10/1981 | Sergent | 342/104 |
| 4,335,382 | A * | 6/1982 | Brown et al. | 342/104 |
| 4,335,383 | A * | 6/1982 | Berry | 342/115 |
| 4,740,045 | A * | 4/1988 | Goodson et al. | 342/115 |
| 4,743,908 | A * | 5/1988 | Brassfield et al. | 342/113 |
| 5,049,885 | A | 9/1991 | Orr | |
| 5,083,129 | A | 1/1992 | Valentine et al. | |
| 5,134,406 | A | 7/1992 | Orr | |
| 5,151,701 | A | 9/1992 | Valentine et al. | |
| 5,159,345 | A | 10/1992 | Young | |
| 5,177,691 | A | 1/1993 | Welles et al. | |
| 5,206,651 | A | 4/1993 | Valentine et al. | |
| 5,300,932 | A | 4/1994 | Valentine et al. | |
| 5,305,007 | A | 4/1994 | Orr et al. | |
| 5,315,302 | A | 5/1994 | Katsukura et al. | |
| 5,347,120 | A | 9/1994 | Decker et al. | |
| 5,504,488 | A * | 4/1996 | Henderson et al. | 342/115 |
| 5,525,996 | A * | 6/1996 | Aker et al. | 342/104 |
| 5,528,246 | A * | 6/1996 | Henderson et al. | 342/115 |
| 5,557,281 | A | 9/1996 | O'Conner | |
| 5,563,603 | A * | 10/1996 | Aker et al. | 342/115 |
| 5,570,093 | A * | 10/1996 | Aker et al. | 342/104 |
| 5,691,724 | A * | 11/1997 | Aker et al. | 342/104 |
| 6,008,752 | A * | 12/1999 | Husk et al. | 342/104 |
| 6,198,427 | B1 | 3/2001 | Aker et al. | |
| 6,646,591 | B1 | 11/2003 | Aker et al. | |

OTHER PUBLICATIONS

MPH L55 Laser, Description and Specifications, M.P.H. Industries, Inc. pp. 1-8, Date Unknown.

MPH L-55 Laser with Stealth Instruction Manual, M.P.H. Industries Inc., pp. 1-6, Date Unknown.

Applied Concepts brochure on Stalker, ATR The First Major Innovation in Traffic Speed Radar in Ten Years, 4 pages, No Date.

Kustom Signals, Inc. H.A.W.K. Traffic Safety Radar brochure, 4 pages, No Date.

muni quip MDR-1X Band Moving Track Radar Brochure, 2 pages, No Date.

U.S. Appl. No. 09/690,179, Unpublished, Aker et al.

* cited by examiner

M

FROM FIG. 13K

↓

YES

↓

278

DISPLAY SPEED OF FASTEST CANDIDATE AND, OPTIONALLY, DISPLAY SPEED OF STRONGEST CANDIDATE SIMULTANEOUSLY, AND, OPTIONALLY, DISPLAY PATROL SPEED ALSO

↓

RETURN TO START

FIG. 13M

FROM FIG. 14K

↓ YES

278 — DISPLAY SPEED OF FASTEST CANDIDATE AND, OPTIONALLY, DISPLAY PATROL SPEED ALSO

↓

RETURN TO START

FIG. 14M

DOPPLER COMPLEX FFT POLICE RADAR WITH DIRECTION SENSING CAPABILITY

This application is a continuation of application Ser. No. 10/005,553 filed Nov. 7, 2001, now U.S. Pat. No. 6,646,591; which is a continuation of application Ser. No. 09/690,179 filed Oct. 16, 2000, abandoned; which is a continuation of application Ser. No. 09/120,542 filed Jul. 21, 1998, now U.S. Pat. No. 6,198,427.

TECHNICAL FIELD OF THE INVENTION

The invention is useful in the field of traffic surveillance radars.

BACKGROUND OF THE INVENTION

In certain multitarget situations when traffic is being observed by a police Doppler radar in the same lane as the patrol car and in the opposite lane, it is useful to be able to limit the targets whose speeds are displayed to targets only in the same lane or only in the opposite lane. The same is true for stationary operation at the roadside. Further, it is useful to be able to use the radar to search for only the strongest target or both the strongest target and the fastest target or only the fastest target.

Police Doppler fast Fourier transform digital signal processing radars which can find the strongest target ha e been in public use for many years starting with the introduction of the STALKER™ handheld, digital Doppler digital signal processing (DSP) radar by Applied Concepts, Inc. of Plano, Tex. Police Doppler fast Fourier transform digital signal processing radars which can find the strongest target or the strongest target with simultaneous display of the fastest target have been in public use for many years starting with the introduction of the STALKER DUAL™ dash mounted Doppler police traffic surveillance by Applied Concepts, Inc. of Plano, Tex. The STALKER DUAL™ dash mounted Doppler police traffic surveillance radar is fully described in U.S. Pat. No. 5,691,724 which has an effective filing date of Feb. 10, 1995, the full contents of which are hereby incorporated by reference. Police Doppler fast Fourier transform digital signal processing radars which can find the strongest target or the fastest target in separate searches selected by the operator have been in public use for many years starting with the introduction of the EAGLE™ dash mounted, digital Doppler DSP series of radars by Kustom Signals, Inc. of Lenexa, Kans. The EAGLE™ dash mounted, digital Doppler DSP series of radars are partially described in U.S. Pat. No. 5,528,246, the contents of which are hereby incorporated by reference. There is a significant difference between the STALKER DUAL™ dash mounted Doppler police traffic surveillance radar and the EAGLE™ dash mounted, digital Doppler DSP series of radars, as described in U.S. Pat. No. 5,528,246 in that in the STALKER DUAL™ dash mounted Doppler police traffic surveillance radars, there is no separate search for the fastest target which can be selected by the operator and which ignores the strongest targets. The STALKER DUAL™ dash mounted Doppler police traffic surveillance radar always searches for the strongest target even when the operator selects fastest mode, and will not search for a fastest target until a valid strongest target has been found.

All of the FFTs done in the STALKER™ handheld, digital Doppler digital signal processing (DSP) radar and EAGLE™ dash mounted, digital Doppler DSP series of radars are non-complex FFTs, and none of these radars had direction sensing capability. An analog Doppler radar that has direction sensing capability is disclosed in U.S. Pat. No. 5,557,281, the contents of which are hereby incorporated by reference. That radar discloses a quadrature shifted two channel Doppler signal that is processed by a PLL to lock onto the frequency of one doppler signals in one channel. Another set of circuits determines direction by examining both channels and sends a signal to the PLL line of circuitry to tell it which direction the target it is locked on is travelling. It is unclear if this analog radar is operative in a multitarget environment where the strength of the various targets is varying rapidly since it is unclear which target the PLL will lock onto and which target will be sensed for direction. It is possible that the direction sensing circuitry will tell the PLL circuitry the direction of a different target than the target to which the PLL is locked thereby causing an error.

Therefore, a need has arisen for a digital FFT radar with direction sensing capability. Further, a need has arisen for such a radar that can find the strongest or fastest and strongest target or the fastest target alone.

SUMMARY OF THE INVENTION

There is disclosed herein a digital, complex FFT radar with direction sensing capability using a two channel Doppler front end with a 90 degree phase shift in the Doppler signals of the two channels. The two channels of information are, optionally, digitally gain controlled, and are digitized. The digital samples from each channel are then processed by a digital signal processor using a complex FFT resulting in a receding target spectrum and an approaching target spectrum of Fourier components.

Several single mode radars are disclosed in the form of flowcharts indicating the manner of processing the two half spectra of receding and approaching targets to find either the strongest target alone or the fastest target alone in various stationary, moving same lane or moving opposite lane operation.

There is also disclosed a process for a multimode digital FFT, direction sensing, Doppler radar where the operator can select between the following modes:
stationary, strongest only, receding only
stationary, strongest only, approaching only
stationary, strongest and fastest, approaching only
stationary, strongest and fastest, receding only
moving, same lane only, strongest only
moving, same lane only, strongest and fastest
moving, opposite lane only, strongest only
moving, opposite lane only, strongest and fastest An alternative embodiment is also disclosed for a multimode digital FFT, direction sensing, Doppler radar where the operator can select between the following modes:
stationary, strongest only, receding only
stationary, strongest only, approaching only
stationary, fastest only, approaching only
stationary, fastest only, receding only
moving, same lane only, strongest only
moving, same lane only, fastest only
moving, opposite lane only, strongest only
moving, opposite lane only, fastest only In all fastest search embodiments, it is preferred to collect samples which were digitized at a known gain level by virtue of using the DSP to control the gain of an amplifier such as the amplifiers 62 and 64 in FIG. 3 and the two amplifiers 62 and 64 in the two channels of FIG. 4. Further, in all fastest searches, it is preferable to do a strongest search first and to maintain a record of some number of the strongest signals in the spectrum such that the fastest target candidates can be screened to eliminate false fastest targets. It is known that false fastest targets can arise as second or third harmonics of patrol speed or other strong signals in the spectrum and can arise as the sum products of two strong signals in the spectrum if the signals are strong enough to exceed a harmonic threshold or if the signals are strong enough to exceed an intermodulation product threshold. By doing a strongest search first and keeping track of the frequencies of the strong signals, qualification tests can eliminate fastest candidates if it appears that they may be harmonics or intermodulation products of the known strong signals. It is necessary to know the frequency of the patrol speed and strong signals to make such a screening. Fastest target processing allows the operator to "look past" the strongest target (usually the closes vehicle) and measure and display speeds of more distant vehicles which are approaching at a faster speed than the strongest target. Intermodulation effects can produce spectral signals which can be falsely interpreted as weak "faster" targets. In order to determine if a target is a rue faster target, the received data is operated on by a 512 point FFT, which results in a 256 point spectral analysis. The spectral strength and spectral bin number of the five strongest spectral lines are used to determine if the potential target bin number is a multiple of one of these line or if its spectral bin number is nearly the same as the sum of any two of the five lines or nearly the same as the absolute difference of any two of the five lines. Thus, the patentee adopts as a definition of the "fastest target" for purposes of this specification and its appended claims, a target which is faster than the strongest target and which has been qualified to make sure it is not a false fastest target.

A further degree of refinement in the fastest target screening process is provided by using the controlled gain amplifiers to amplify the doppler signals before they are digitized. By knowing the gain that was in effect as each batch of samples were gathered, it is possible to calculate the true power of any signal in the spectrum from its apparent or relative power and the gain that was in effect when the samples were collected. This allows fastest target candidates to be not rejected even if they are at a frequency that is a double or triple of the patrol speed or a strong signal if the patrol speed or strong signal does not have a true power that exceeds an experimentally determined harmonic generation threshold. Likewise, a fastest candidate that has a frequency that happens to be at the sum of the frequencies of two strong signals need not be eliminated if the true powers of the two strong signals do not exceed power thresholds which are experimentally determined to be likely to cause intermodulation products to exist. This has the significant advantage that it does not blind the radar to legitimate fastest targets if the underlying strong signals are not strong enough to have caused harmonics or intermodulation products.

BRIEF DESCRIPTION OF THE DRAWINGS

FIGS. 13A through 13M together comprise a flowchart of the process carried out by the DSP in the embodiment of FIG. 4 or any other such two antenna embodiment to implement a multimode, doppler, complex FFT, direction sensing traffic surveillance radar where the operator can choose between a strongest only search or a strongest and fastest target search in either stationary, moving opposite lane or moving same lane modes of operation and can also choose between either a front or a rear antenna.

FIGS. 14A through 14M together comprise a flowchart of the process carried out by the DSP in the embodiment of FIG. 4 or any other such two antenna embodiment to implement a multimode, doppler, complex FFT, direction sensing traffic surveillance radar where the operator can choose between a strongest only search or a fastest target only search in either stationary, moving opposite lane or moving same lane modes of operation and can also choose between either a front or a rear antenna.

DETAILED DESCRIPTION OF THE INVENTION

Figure 1:
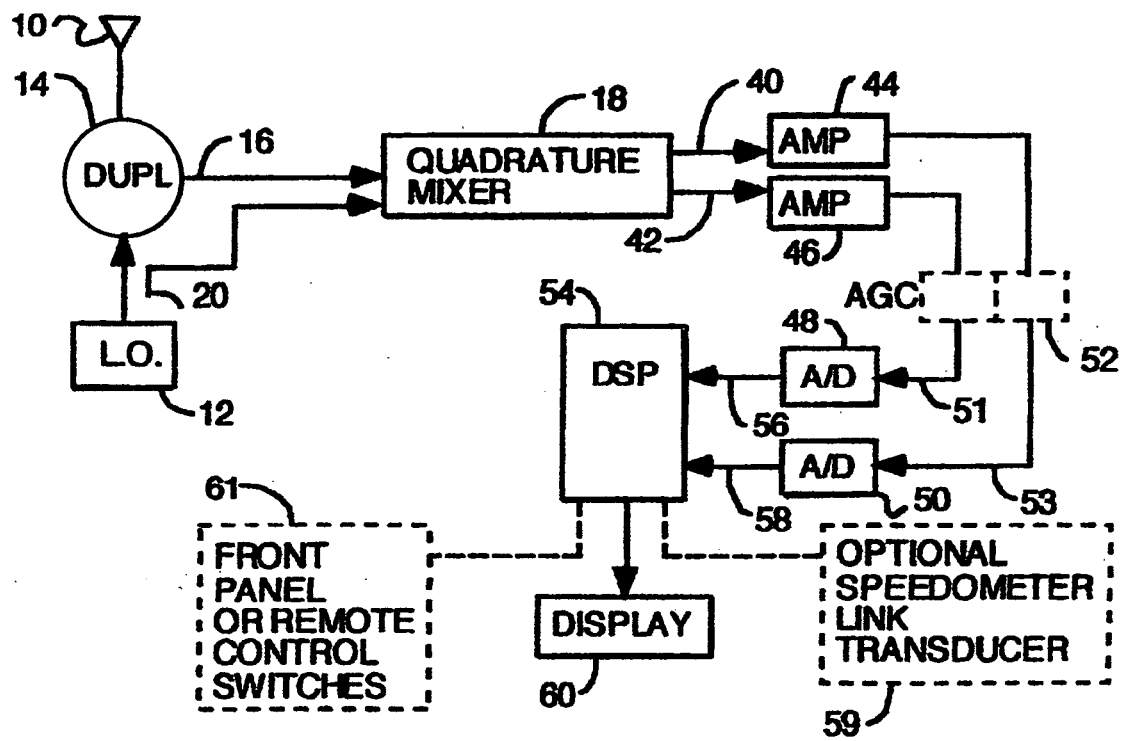
FIG. 1 is a block diagram of the circuitry of a digital, FFT, direction sensing radar which can be used to practice the invention.

Referring to FIG. 1, there is shown a block diagram of a doppler, complex FFT, digital radar with direction sensing capability. A microwave antenna 10 is used to transmit outgoing radar beams and receive reflected radar energy from moving and stationary objects. Outgoing radar waves are generated by local oscillator 12. Duplexer 14 is used to guide outgoing energy from local oscillator 12 to antenna 10 and guide reflected energy received by antenna 10 out on line 16 to quadrature mixer 18. A capacitive probe 20 picks up some of the outgoing local oscillator energy and couples it to a local oscillator input of quadrature mixer 18.

Figure 2:
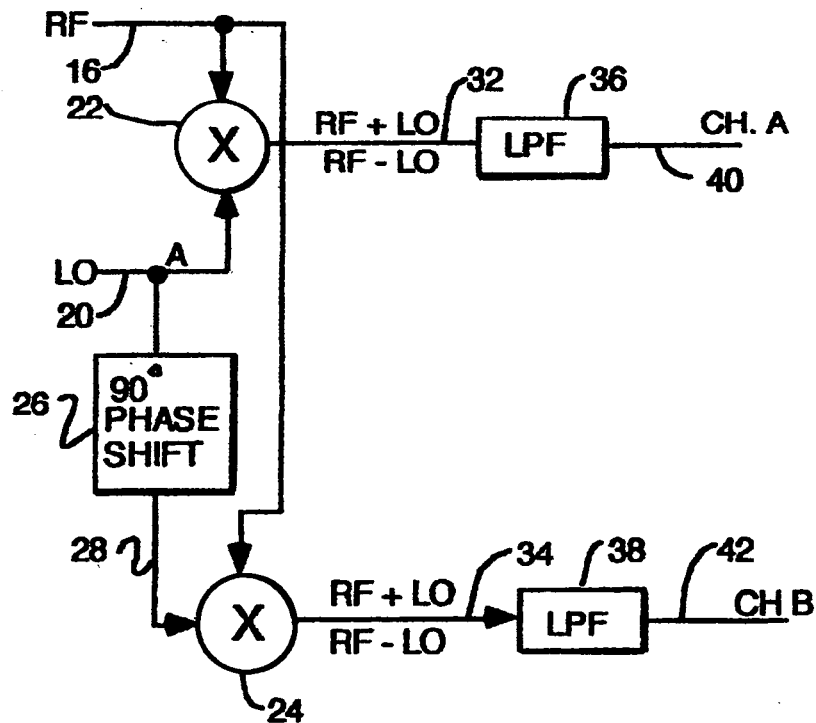
FIG. 2 is a block diagram of the preferred form of quadrature mixer.

FIG. 2 is a block diagram of quadrature mixer 18. The function of the quadrature mixer is to mix local oscillator energy with incoming RF of reflected waves in two separate mixers in two separate channels and shift one channel 90 degrees relative to the other channel. Incoming RF from the duplexer arrives via line 16 at a channel A mixer 22 and a channel B mixer 24. Local oscillator energy arrives on line 20 and is coupled directly into a second input of mixer 22. The local oscillator energy is also coupled to a second input of mixer 24 through a 90 degree phase shifter 26. The function of the phase shifter is to shift the local oscillator signal on line 28 90 degrees (or any integer multiple of 90 degrees hereafter simply referred to as a 90 degree phase shift) in either direction relative to the local oscillator signal on line 20. In alternative embodiments, instead of shifting the local oscillator signal by 90 degrees, the incoming RF can be shifted by 90 degrees at the input of one mixer relative to the same incoming RF at the input of the other mixer.

The 90 degree phase shift can be achieved in any known manner. In the preferred embodiment, the 90 degree phase shift is achieved by having a microwave transmission line which is one-quarter wavelength (at the frequency of operation) longer in the path from the local oscillator or RF input 16 to one mixer than it is in the path to the other mixer. Other techniques such as reactive circuits or delay lines could also be used.

The mixers 22 and 24 mix the local oscillator signals with the doppler shifted RF signals reflected from stationary and moving objects and output sum and difference frequencies on each of the channel A line 32 and the channel B line 34. Each of these lines is coupled to a low pass filter 36 and 38, respectively. Preferably, to reduce errors and noise, the mixers and low pass filters are matched as closely as possible since amplitude variations between channel A and channel B cause noise in the system. The function of the low pass filters is to remove the upper sideband (local oscillator plus doppler shifted RF) 30 from each of the spectrum on lines 32 and 34 so that only the difference frequencies are output on lines 40 and 42.

Returning to the consideration of FIG. 1, the channel A and channel B outputs on lines 40 and 42 are coupled to the inputs of a pair of amplifiers 44 and 46. For best performance, amplifiers 44 and 46 are matched and low noise.

The outputs of the amplifiers are coupled either directly to the input of analog-to-digital converters 48 and 50 or indirectly through an optional gain control circuit 52. The optional gain control circuit can be either a two channel gain control circuit with matched circuitry in both channels or two separate gain control circuits which are matched as closely as possible. The gain control circuits are only necessary in radars where targets might be tracked to distances which are so close that their amplitude changes from the farthest distance at which they are acquired to the closest distance from the radar to which the target approaches is greater than the dynamic range of the radar. Dynamic range is determined by a number of things including the range of the analog-to-digital converters and the noise floor of the system. Typical dynamic range is about 70 dB which translates to a range of tracking a target from about 1.5 miles down to 140 feet before the dynamic range of the radar is exceeded. As long as targets are tracked only within this range and strong returns from stationary objects close to the radar are not received, the radar will be accurate without the use of automatic gain control circuit 52. However, it is preferred to have gain control circuit 52 so that issues of accuracy of readings caused by exceeding the dynamic range of the radar need not be of concern. The gain control circuits can be self-regulating or receive gain control signals from digital signal processor 54.

The function of the A/D converters 48 and 50 is to sample the analog signals on lines 51 and 53 and output these samples as digital sample values on buses 56 and 58 coupled to digital signal processor 54. The manner of getting the channel A and channel B digital samples into the DSP 54 is not important and any physical structure such as a single shared bus or two buses and interrupt or polled or serial synchronous data frame transmission on a single serial format data path may be used. In the preferred embodiment, the A/D converters are located in a separate housing and are a single, two-channel A/D converter which outputs two words of data bits in each frame, each word encoding the sample from either channel A or channel B. A serial data path carries the concatenated serial format words along with a master clock signal from the A/D converter in the antenna housing to the main processing unit having DSP 54 and located in another housing. Frame synchronization is achieved by having a clock pulse of the master clock signal at the frame boundary modified to have a wider than normal pulse width. In the broadest definition of the genus of radars according to the teachings of the invention, the manner in which the digital samples from channels A and B are transmitted to the DSP is not important.

The function of the digital signal processor 54 is to process the digital samples from channels A and B by performing a complex fast fourier transform on them to develop an approaching target Fourier spectrum and a receding target Fourier spectrum and then to analyze one or both of these spectrums to determine a target speed and display it. A number of flowcharts are included below which define the processing of the DSP in various alternative embodiments. In some of these alternative embodiments, the radar functions as a single-antenna, single-mode radar that finds one target speed and displays it where the sought for target might be the strongest target or the fastest target and the radar may be moving or stationary depending upon the mode. In another alternative embodiment, the DSP carries out a process to implement a multimode radar where operator selection of moving or stationary mode and between approaching targets only and receding targets only is provided and operator selection between strongest only or strongest and fastest target searching and display in any of these modes is also provided. Operator selectability between moving same lane and moving opposite lane and between front and rear antennas is also provided as well as operator selectability between strongest only or strongest and fastest search and display.

In another alternative embodiment, the DSP carries out a process to implement a multimode radar where operator selection of moving or stationary mode and between approaching targets only and receding targets only is provided and operator selection between strongest only or fastest only target searching and display in any of these modes is also provided. Operator selectability between moving same lane and moving opposite lane and between front and rear antennas is also provided as well as operator selectability between strongest only or fastest only search and display. The selected target or targets found in the search has the frequency of its Fourier component converted to speed and displayed on display 60. Display 60 typically has three display windows, one for patrol speed in moving modes, one for the strongest target's speed and one for the fastest target's speed. In embodiments where operator selectability between either fastest or strongest is provided, only two display windows are needed, one for strongest or fastest target speed and one for patrol speed in moving modes. Optional front panel or remote control switches 61 provide operator selectability of the target speeds to be displayed or the searches to perform on the Fourier spectra generated by the complex FFT by selection between the various modes if the DSP 54 is programmed to be capable of implementing more than one operator selectable mode.

In species within the genus of the invention wherein patrol car speed is determined from the car's speedometer (as opposed to processing returns from stationary objects such as the ground), an optional speedometer link transducer 59 provides a signal or data to the DSP from which the indicated speed on the speedometer can be determined for use in moving mode target speed calculations.

Figure 3:
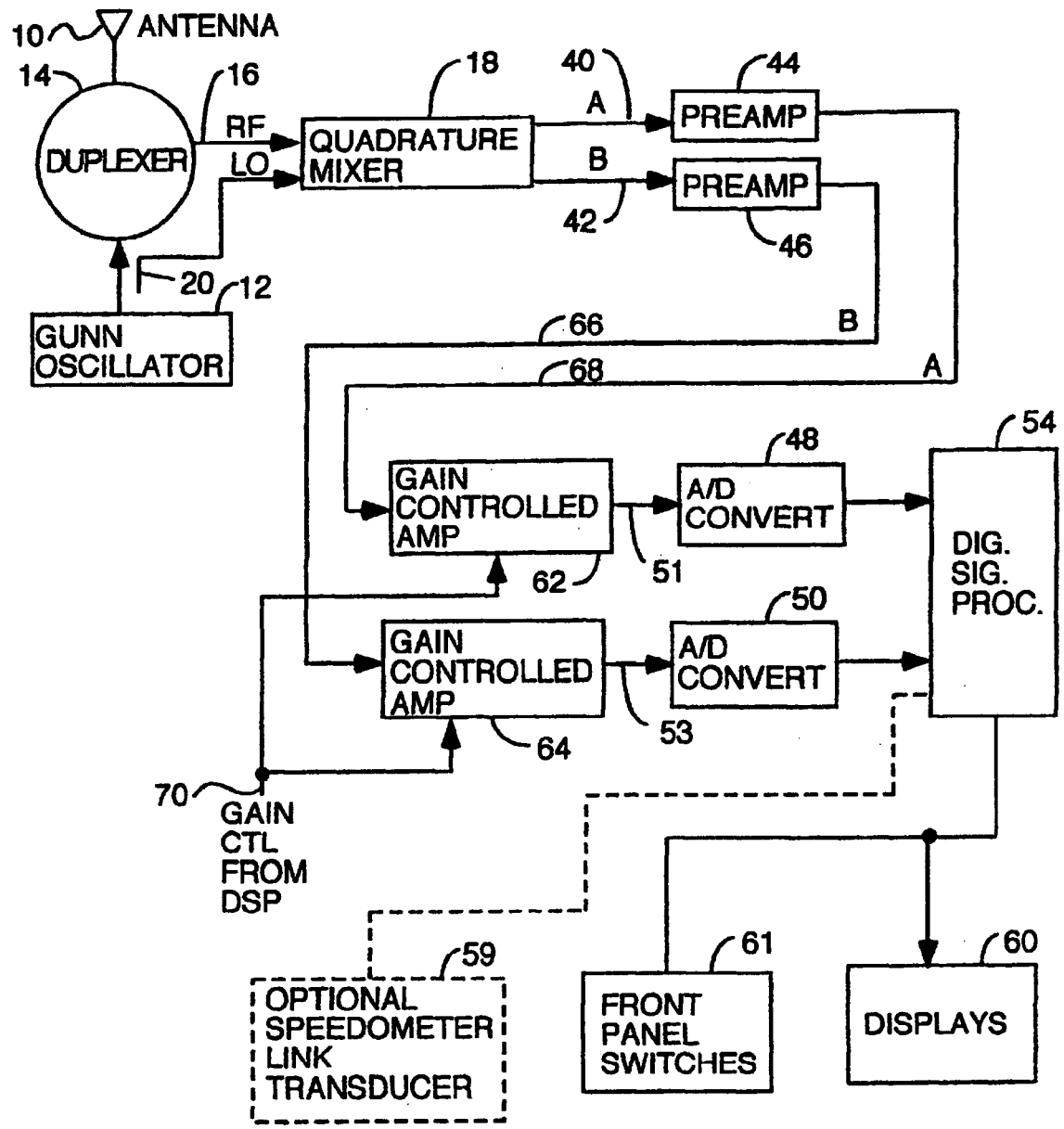
FIG. 3 is a block diagram of a preferred form of police Doppler radar having a controlled gain amplifier in front of the analog-to-digital converters to improve the useful operating range and having direction sensing capability.

FIG. 3 is a block diagram of the preferred embodiment for the circuitry of a digital, doppler, complex FFT traffic radar using gain control amplifiers which are controlled by the DSP for better screening of fastest targets. All devices having reference numbers which are the same as reference numbers on blocks in FIG. 1 have the same structure and function in the combination as like numbered structures in FIG. 1. Gain control amplifiers 62 and 64 are coupled to amplify the channel A and B signals on lines 66 and 68 output by the matched, low noise preamplifiers 44 and 46. The gain of amplifiers 62 and 64 is controlled by signals on line 70 which is controlled by DSP 54. The gain control signals may be digital signals sent by DSP 54 as a result of processing like the gain control processing described in U.S. Pat. No. 5,691,724. Alternatively, the gain control signals may be analog signals derived from data output by the DSP 54. Alternatively, an automatic gain control circuit can be used with the automatic gain control reporting its gain to the DSP either by a polling or interrupt process.

The advantage of having gain control amplifiers controlled by the DSP, or, alternatively, providing knowledge to the DSP as to what gain was in effect during the time each sample was collected is that such knowledge provides the ability to extend the dynamic range of the radar. Knowledge of the gain in effect during the time each buffer of samples is collected allows the DSP to calculate the true power of signals in the Fourier spectrum in the manner described in U.S. Pat. No. 5,691,724. This provides the ability to do better screening of strongest and fastest candidates to eliminate false targets caused by harmonics and intermodulation products between strong signals in the spectrum. Generally, false targets, whether strongest or fastest, can be caused by harmonics of strong signals such as the patrol speed or strong targets caused by target vehicles which are close or have large radar cross sections or both. Likewise, it has been found that false targets, especially false fastest targets, can be created when multiple strong targets exist in the spectrum and their signals mix to create sum and difference products.

Generally, neither harmonics nor intermodulation products will be generated at a sufficient amplitude to be detected as false targets unless the strong signals are above a certain true power level. Having knowledge of the gain in effect when each buffer of samples was collected allows the DSP to calculate the true power of the strongest signals in the spectrum. This knowledge of true power along with the knowledge of the speed of each of the strong signals in the spectrum allows the DSP to screen target candidates, especially fastest target candidates, to eliminate candidates that are probably harmonics or intermodulation products of various strong signals in the spectrum. This is also a serious advantage in the embodiments described herein which do strongest searching before doing fastest searching. By doing strongest searching first, the DSP gains knowledge of the strongest signals in the spectrum and can calculate their true powers. This allows fastest candidates to be screened out as false targets if they are at a speed which is an integer multiple of the speed of a strong signal which has a true power above the harmonic generation threshold. It also allows fastest candidates to be screened out as false targets if they are at a speed which is either a sum or difference of the speeds of two strong signals which are above the intermodulation product strength thresholds. Screening of fastest candidates (called "qualification" in the flowcharts herein) to eliminate candidates that have inadequate signal-to-noise ratios, that might be corrupted or an anomaly caused by a very strong signal nearby, that might be a result of noise generated by RFI or a mobile data terminal, that may be a harmonic of the strongest signal displayed or a harmonic of the patrol speed, or that might be a harmonic or intermodulation product of the five other strongest signals in the spectrum is known and is described in detail in U.S. Pat. No. 5,691,724, which is incorporated herein by reference.

Front panel switches 61 and displays 60 are coupled to the DSP by any form of suitable data path. The embodiments shown in FIGS. 1, 3 and 4 are all intended to symbolize radars where the antenna or antennas and the DSP are all in the same enclosure as well as embodiments wherein the antenna or antennas are in separate housing or housing mounted somewhere on the patrol car facing in the desired direction along with all the circuitry except the DSP and the DSP is in a separate housing in the cab of the patrol car and coupled to the antennas by any form of data path including serial format cable, parallel format cable, infrared or radio link.

Figure 4:
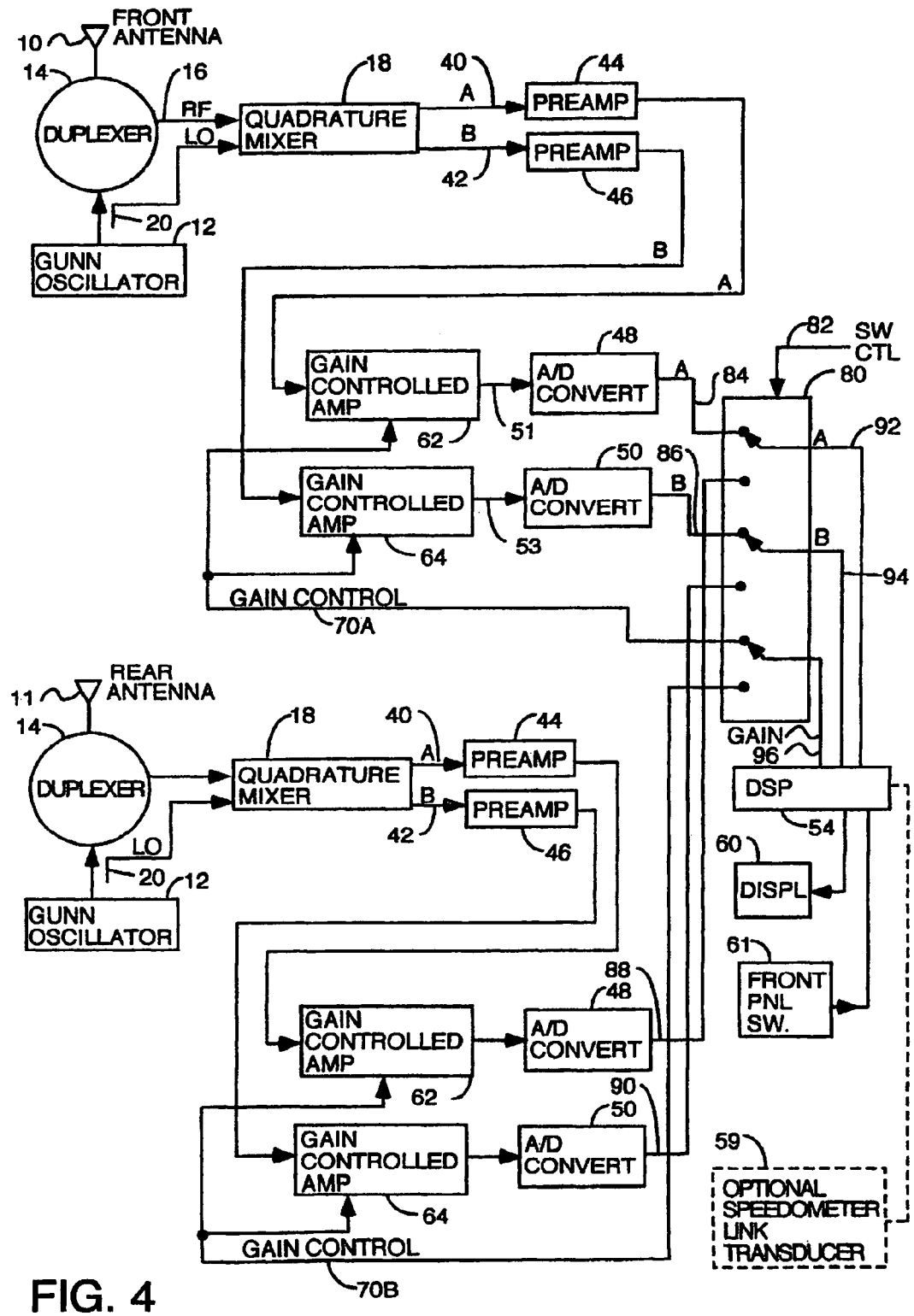
FIG. 4 is a block diagram of a preferred form of two antenna, controlled gain police Doppler radar with direction sensing capability.

Referring to FIG. 4, there is shown the preferred two antenna embodiment. Again like numbered blocks as blocks in FIG. 1 or 3 have the same structure and function in the combination. The main difference between the embodiments of FIGS. 3 and 4 is that the embodiment of FIG. 4 has two antennas and two sets of analog circuits and a multiplexer 80 coupled to select between the two antennas. There is full duplication of all the analog circuitry associated with each antenna in that antenna's housing to transmit, receive, generate a local oscillator signal, quadrature shift and mix, amplify, gain control and digitize the audio range Doppler signals. The multiplexer 80 has a switch control input 82 which may be an electronic signal generated by the DSP 54 on the basis of an antenna selection made by the operator by manipulating a front panel or remote control switch, or it may be an electrical signal generated by manipulation of any switch or it may be a mechanical input. The multiplexer selects between the A and B channel digital inputs on lines 84 and 86 from the front antenna A/D converters or the A and B channel inputs 88 and 90 from the rear antenna A/D converters for application on data paths 92 and 94 to the DSP. The multiplexer also switches the digital gain control word on line 96 through to the gain control inputs (line 70A or line 70B) of the gain control amplifiers of the front or rear antenna depending upon which antenna is selected.

In alternative embodiments, the multiplexer 80 could also be an analog multiplexer placed on the inputs of the A/D converters 48 and 50 thereby eliminating two A/D converters. The digital multiplexer 80 as shown in FIG. 4 is the preferred embodiment where the two antennas are located on the front and rear of the patrol car with the A/D converters in their housings with digital data transmission from the antennas to the DSP (to eliminate RFI pickup on long analog signal lines from the antennas to the DSP). In embodiments where RFI is not a problem or the two antennas are located close enough to share a single pair of A/D converters, the analog multiplexer at the A/D inputs is preferred because of its lower cost.

Figure 5:
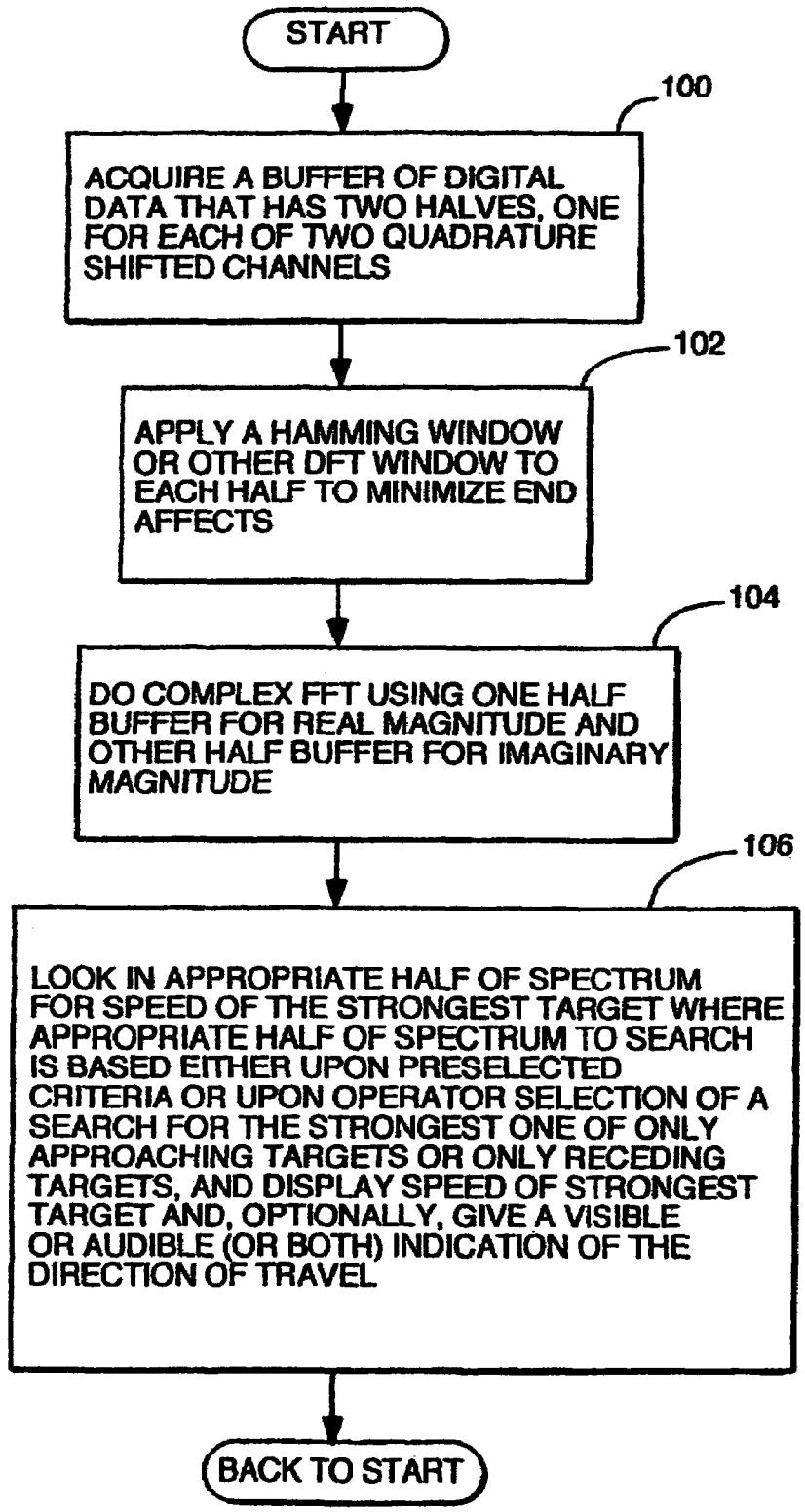
FIG. 5 is a flowchart of a process carried out by the digital signal processor for any of the embodiments of FIGS. 1–4 to implement a single mode, stationary strongest search for single direction targets only.

Referring to FIG. 5, there is shown a flowchart for a simple one mode stationary, strongest only, one direction target only process which is implemented by the DSP in any of the classes of embodiments represented by FIGS. 1, 3 and 4. The process starts with step 100 wherein the DSP acquires a buffer full of data for each channel. The buffer is divided into two halves to keep the data from the different channels separate or it can be two completely separate buffers. In step 102, a Hamming window or other DFT window is applied to both channels of data to minimize end effects in each channel.

In step 104, a complex FFT is done using the sample points from one of the buffers as the real magnitude and the paired sample point from the other buffer as the imaginary magnitude for every complex input vector to the complex number FFT process. The complex FFT results in two output spectra of Fourier components, one for receding targets and the other for approaching targets. Step 104 also represents the optional process of finding and storing the true power and frequency of the patrol speed and a predetermined number of the strongest signals in each spectrum. This requires use of a hardware platform where the gain can be controlled by the DSP for every buffer full of samples so the true power of each target can be determined from its relative power and the gain level that existed at the time the samples were taken from which that target emerged. By knowing the frequency of the patrol speed and the strongest signals in the spectrum, it is possible to do a much more effective and thorough screening of fastest candidates to eliminate false fastest targets that are caused by harmonics or intermodulation sum products. By knowing the true power, it is possible to retain legitimate targets that happen to be at harmonic or intermodulation product frequencies if the underlying strong signals are not strong enough to have created harmonics or intermodulation products thereby preventing the radar from being blinded at these frequencies.

Step 106 represents a search for the strongest target in one of the spectra, the particular spectra picked being a function of whether the radar is set up to search only for approaching targets or only for receding targets. The spectrum picked can be based upon any preselected criteria such as a permanent configuration set by DIP switches on the circuit board or hardwired in the circuitry or software or based upon configuration data established at start up or at the factory or based upon the position of a switch manipulated in real time by the user to select a search for only the strongest approaching target or only the strongest receding target. The speed of the strongest target is then displayed and, optionally, a visible or audible (or both) indication of the direction of target travel is also given.

Figure 6:
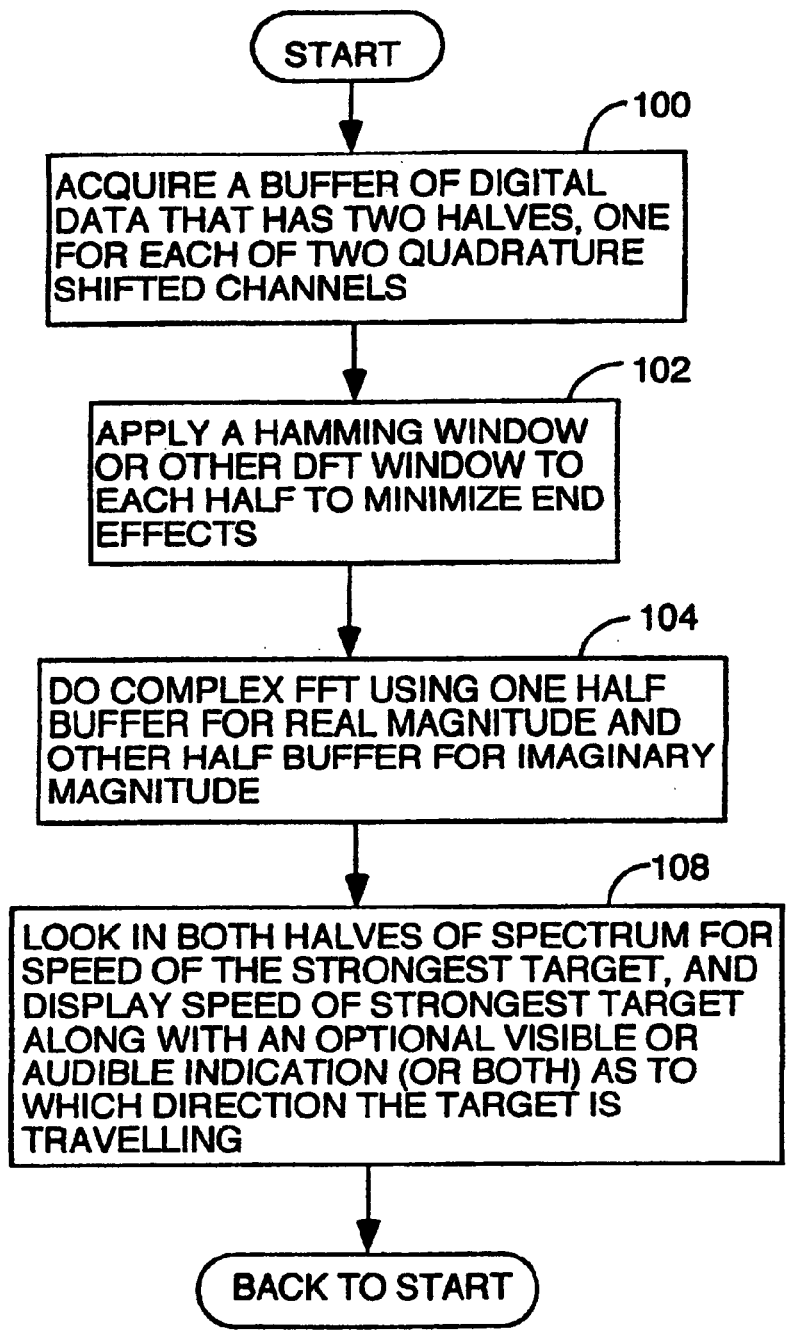
FIG. 6 is a flowchart of the process carried out by the digital signal processor for any of the embodiments of FIGS. 1–4 to implement a single mode, stationary strongest search for targets travelling either toward or away from the radar.

FIG. 6 is a flowchart of another single mode process implemented by the DSP of any of the physical circuits described herein to search in stationary mode for the strongest target regardless of whether it is travelling away from the radar or approaching the radar and giving an indication with the target speed display which direction the target is travelling steps 100 through 104 are the same as described in FIG. 5. Step 108 represents the process of searching both the receding target spectra and the approaching target spectra for the strongest target and displaying the speed of the strongest target along with either a visible or audible (or both) indication of which direction the target is travelling relative to the radar to help the officer in making his or her manual target identification and estimate of speed.

Figure 7:
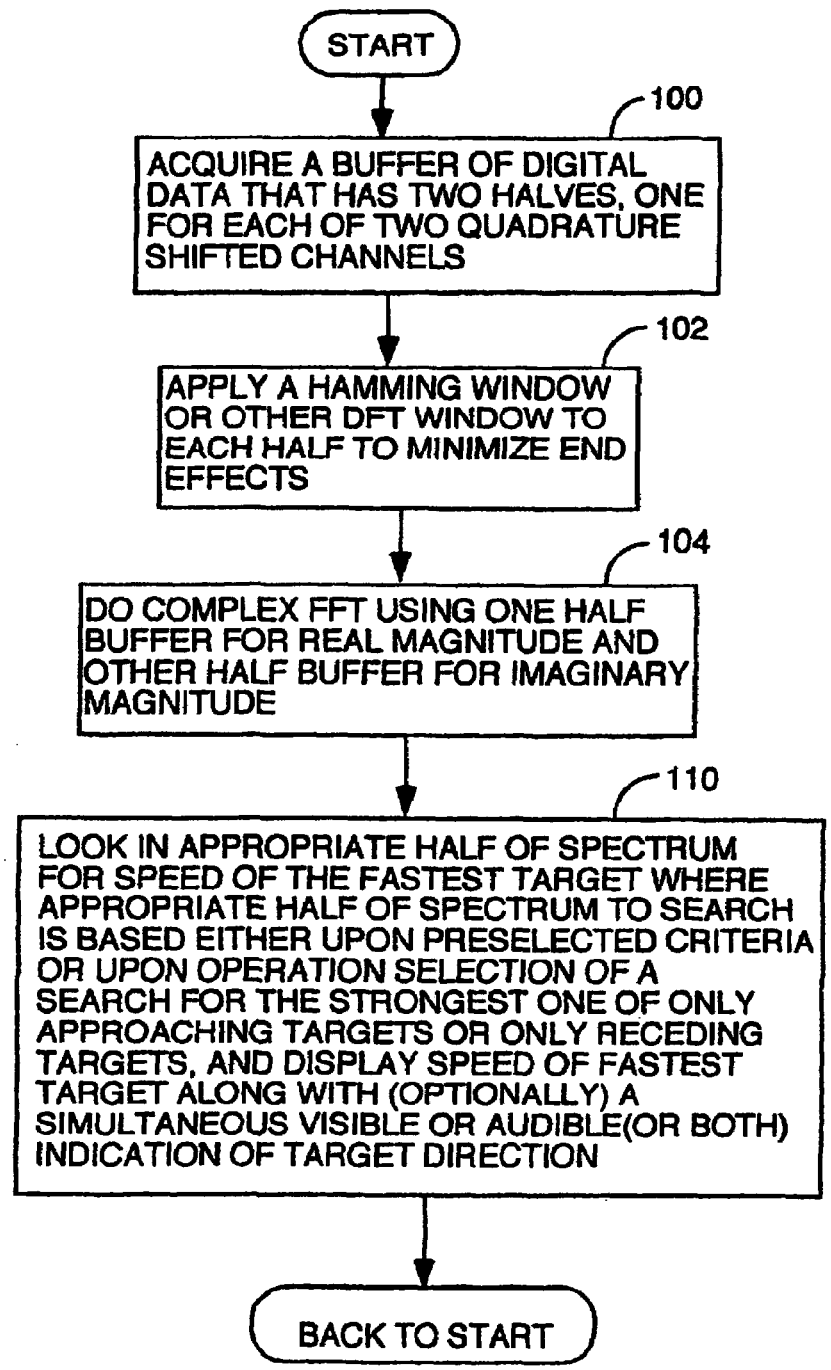
FIG. 7 is a flowchart of a process carried out by the digital signal processor for any of the embodiments of FIGS. 1–4 to implement a single mode, stationary fastest target search for single direction targets ony.

FIG. 7 is a flowchart of another single mode process implemented by the DSP in some embodiments for any of the hardware configurations disclosed herein to search in stationary mode for the fastest target travelling in a single selected direction. Steps 100 through 104 are a previously described. Step 110 represents the process of searching the appropriate approaching or receding target spectrum for the fastest target where the spectrum searched is selected based upon preselected criteria such as a DIP switch or hardwired choice in the hardware or software as to which spectra to search or upon configuration data in a file read by the DSP on startup which configuration data is set by the user or by the factory or upon a switch manipulation in real time by the user. Fastest target processing allows the operator to "look past" the strongest target (usually the closest vehicle) and measure and display speeds of more distant vehicles which are approaching at a faster speed than the strongest target. Intermodulation effects can produce spectral signals which can be falsely interpreted as weak "faster" targets. In order to determine if a target is a true faster target, the received data is operated on by a 512 point FFT, which results in a 256 point spectral analysis. The spectral strength and spectral bin number of target bin number is a multiple of one of these lines or if its spectral bin the five strongest spectral lines are used to determine if the potential number is nearly the same as the sum of any two of the five lines or nearly the same as the absolute difference of any two of the five lines. Thus, the patentee adopts as a definition of the "fastest target" for purposes of this specification and its appended claims, a target which is faster than the strongest target and which has been qualified to make sure it is not a false fastest target. The fastest target found is then converted to speed and the speed is displayed along with a visible or audible (or both) indication of the direction of travel of the target.

Figure 8:
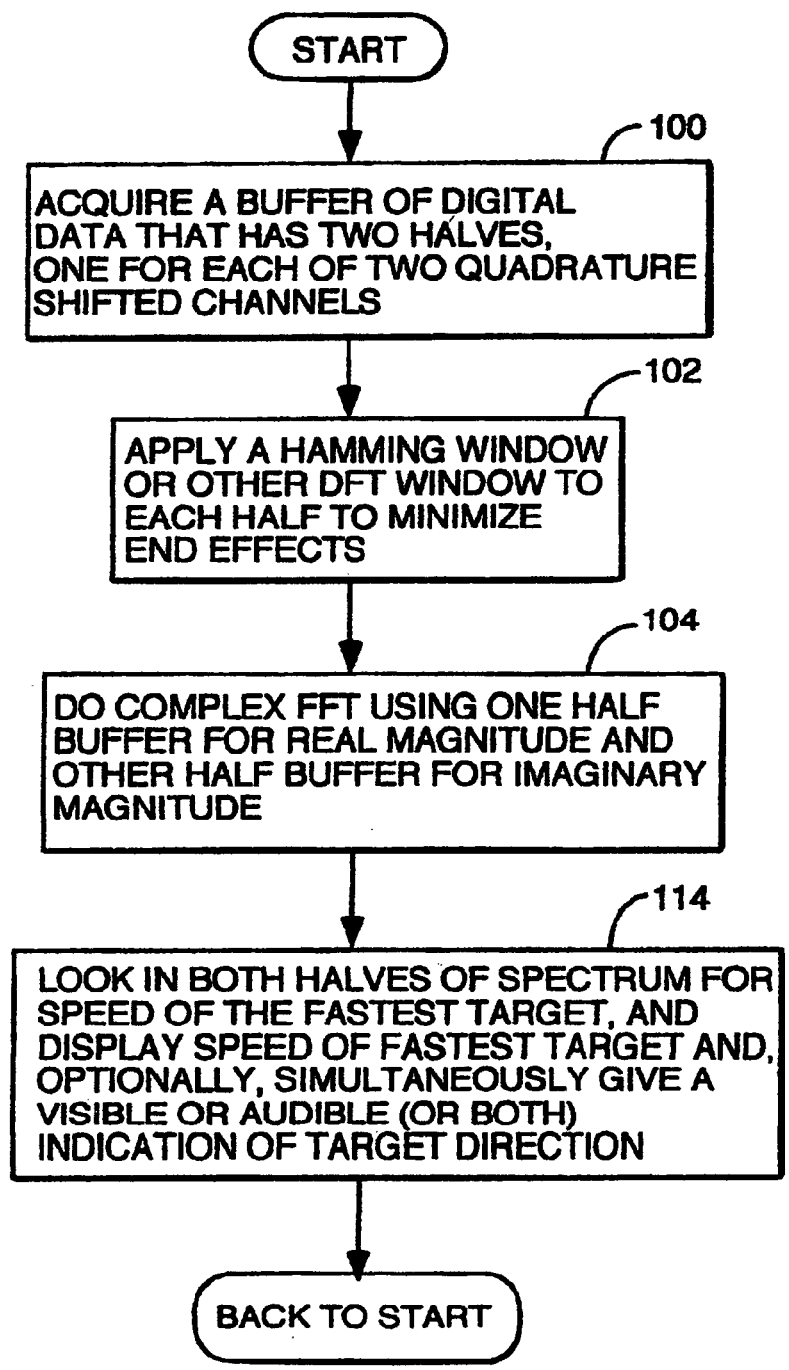
FIG. 8 is a flowchart of a process carried out by the digital signal processor for any of the embodiments of FIGS. 1–4 to implement a single mode, stationary fastest target search for targets travelling either toward or away from the radar.

FIG. 8 is a flowchart of another single mode process implemented by the DSP in some embodiments for any of the hardware configurations disclosed herein to search in stationary mode for the fastest target travelling in either direction. Steps 100 through 104 are the same as previously described. Step 114 represents the process of searching in both the receding and approaching target spectra for the speed of the fastest target and displaying the speed of the fastest target along with an optional visible or audible (or both) indication of the direction of target travel for the displayed target.

Figure 9:
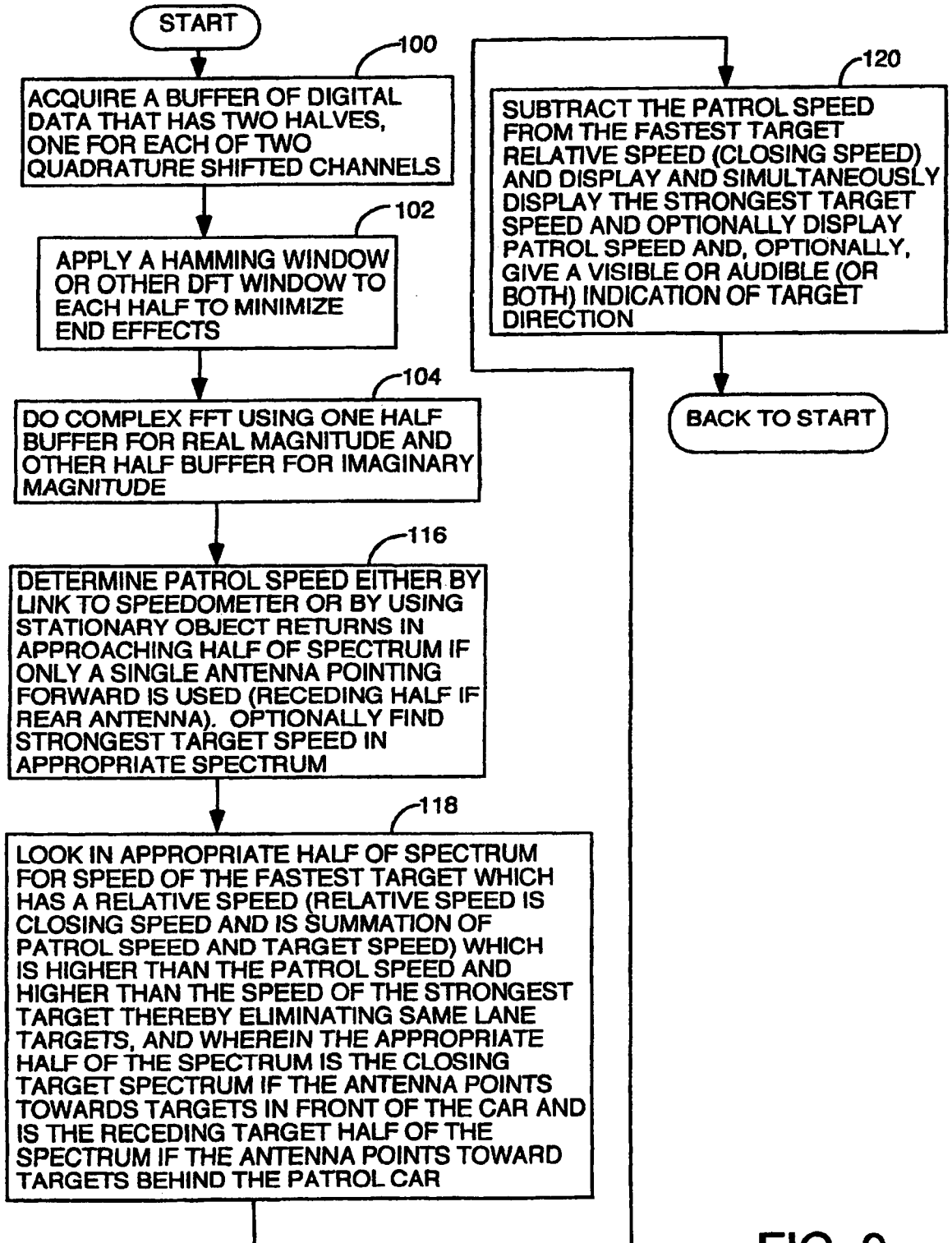
FIG. 9 is a flowchart of a process carried out by the digital signal processor for any of the embodiments of FIGS. 1–4 to implement a single mode, moving, fastest target, opposite lane search for targets travelling in a single direction with an antenna pointing either forward or rearward.

FIG. 9 is a flowchart of another single mode process implemented by the DSP in some embodiments for any of the hardware configurations disclosed herein to search in moving mode for the fastest target travelling in a single selected direction, that direction being in the opposite lane and approaching if the antenna points forward or receding if the antenna points to the rear of the patrol car. Steps 100 through 104 are as previously described. Step 116 represents the process of determining the speed of the patrol car either by means of a link to the speedometer or by acquiring and tracking the patrol car speed from returns from stationary objects as is well known in the prior art. The EAGLE™ dash mounted, digital Doppler DSP series of radars do this by searching for a strong asymmetric return characteristic of the patrol car. The STALKER DUAL™ dash mounted Doppler police traffic surveillance radar and STALKER™ handheld, digital Doppler digital signal processing (DSP) radars look for the strongest return in the spectrum which has an predetermined minimum signal-to-noise ratio looking on the high frequency side of the peak only, and during tracking the patrol car speed does not have to be the strongest signal in the spectrum anymore but the predetermined minimum signal-to-noise ratio is still required. One difference from the prior digital FFT radars however is that the patrol car speed is determined by searching for the patrol car signature return in only the approaching target spectrum. This has the inherent advantage of eliminating a source of error in prior art patrol speed acquisition processes as follows. When a patrol car comes up to a stop sign with a car in front of the patrol car, the prior art patrol speed acquisition processes would frequently lock onto the speed of the car in front as it pulled away from the stop sign as the patrol car ground speed. This error is automatically eliminated by searching for patrol speed in only the approaching spectrum.

Step 116 also represents the process of optionally finding the strongest target speed in the appropriate spectrum where the appropriate spectrum is the approaching spectrum if the antenna point forward and the receding spectrum if the antenna points toward the rear. Regardless of whether the species represented by FIG. 9 does or does not simultaneously display the strongest target speed with the display of the fastest target, the strongest speed is optionally determined in species in which the fastest target speed is defined to be the fastest qualified target which is faster than the strongest target speed. In other species represented by FIG. 9, the fastest target speed may not be restricted to be faster than the strongest target speed such that when there is one car on the road, that car's speed will be displayed as the fastest target. In species were fastest must be faster than the strongest, the one car will be the strongest and there will be no display of a fastest target.

Step 118 represents the process of searching in only the appropriate half of the spectrum for the speed of the fastest target which has a relative speed (closing speed=relative speed=target speed+patrol speed) which is higher than the patrol speed and is also higher than the speed of the strongest target in the preferred embodiment. In an alternative embodiment, the limitation that the fastest target speed must also be faster than the strongest target speed is removed and the search criteria includes at least only that the relative speed is faster than the patrol car speed. The appropriate half spectrum is the approaching spectrum if the antenna points toward the front and receding targets if the antenna points toward the rear of the car. The limitation that the relative speed must be higher than the patrol car speed eliminates same lane targets automatically since they all have relative speeds which are lower than the patrol car speed.

Step 120 represents the process of subtracting the patrol speed from the selected fastest target relative speed and displaying the result as the fastest target speed, and simultaneously displaying the strongest target speed in the preferred embodiment. In alternative embodiments, the strongest target speed can be omitted or the strongest search omitted altogether, the only search being for the fastest opposite lane target. Optionally, the patrol speed is also displayed to allow the user to verify the patrol speed is correct.

Figure 10:
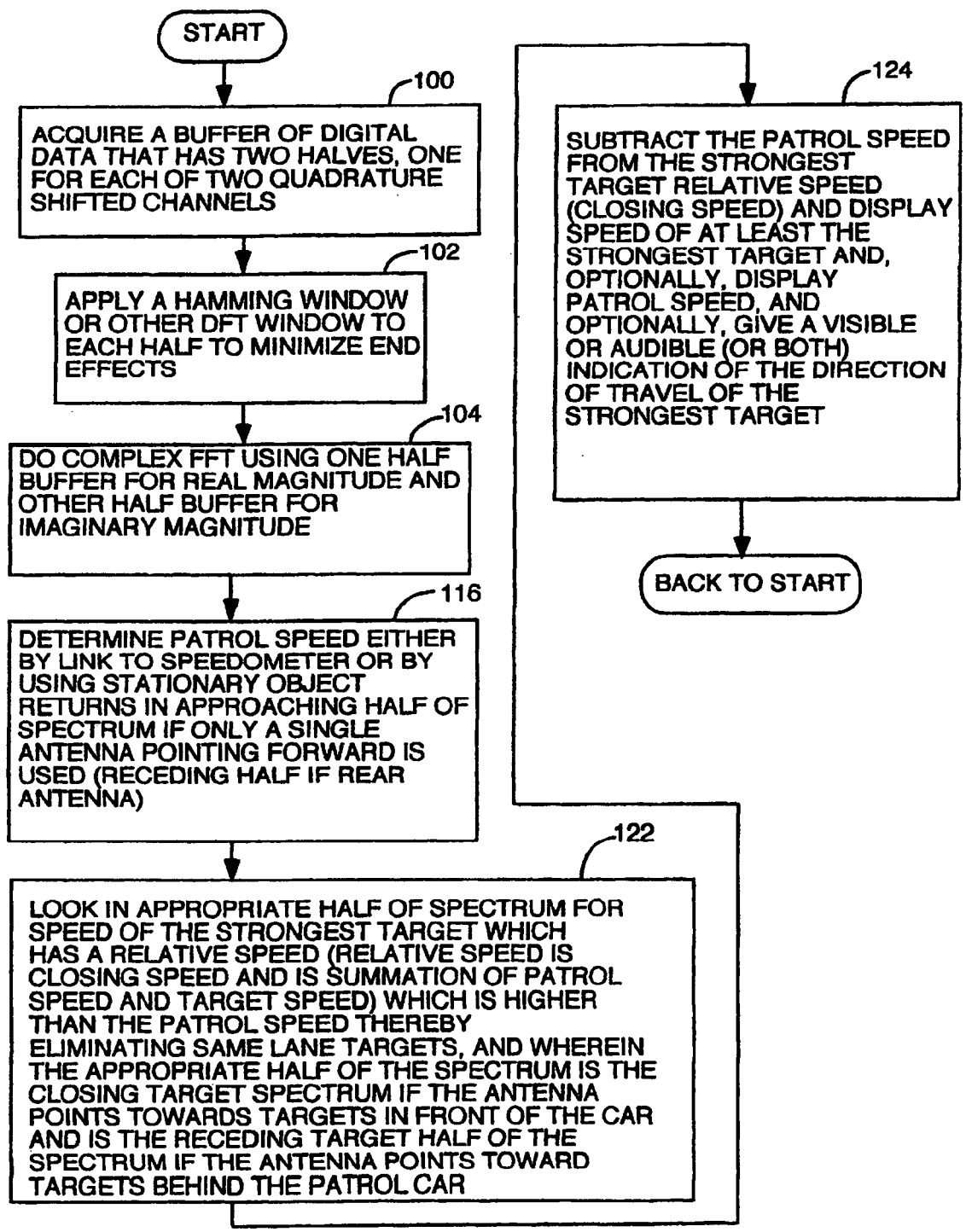
FIG. 10 is a flowchart of a process carried out by the digital signal processor for any of the embodiments of FIGS. 1–4 to implement a single mode, moving, strongest target, opposite lane search for targets travelling in a single direction with an antenna pointing either forward or rearward.

FIG. 10 is a flowchart of another single mode process implemented by the DSP in some embodiments for any of the hardware configurations disclosed herein to search in moving mode for the strongest target travelling in a single selected direction, that direction being in the opposite lane and approaching if the antenna points forward or receding if the antenna points to the rear of the patrol car. Steps 100 through 116 are as previously described.

Step 122 represents the process of searching only in the appropriate half spectrum for the speed of the strongest target which has a relative speed which is higher than the patrol speed. This limitation that all candidates have a higher relative speed than the patrol car automatically eliminates all same lane targets. The appropriate spectrum is the approaching target spectrum if the antenna points toward the front of the car and the receding half spectrum if the antenna points to the rear of the car. Step 124 represents the process of subtracting the patrol speed from the strongest target relative speed and displaying the speed of the strongest target and optionally displaying the speed of the patrol car.

Figure 11:
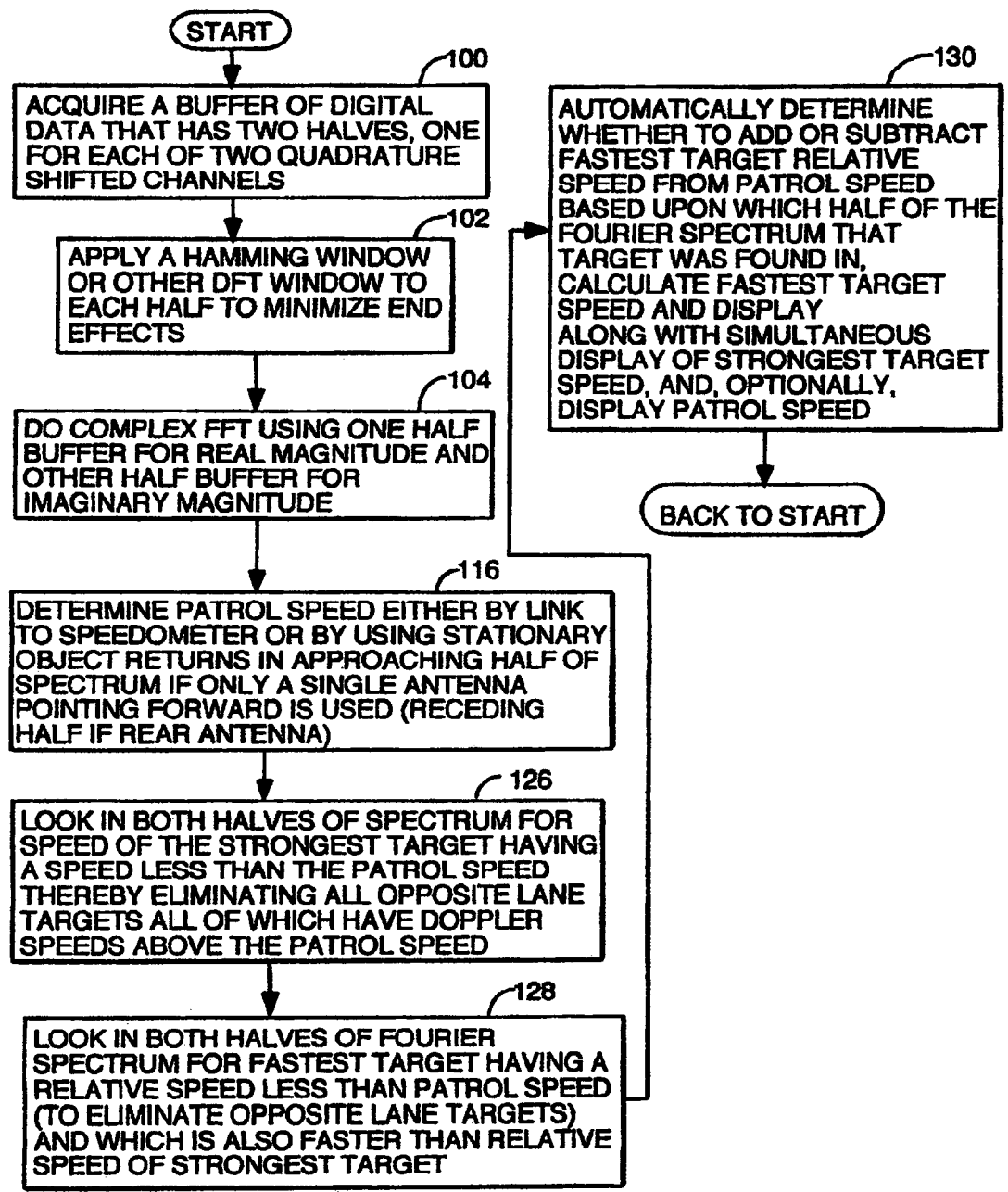
FIG. 11 is a flowchart of a process carried out by the digital signal processor for any of the embodiments of FIGS. 1–4 to implement a single mode, moving, same lane, fastest target search for targets travelling in a single direction with an antenna pointing forward.

FIG. 11 is a flowchart of another single mode process implemented by the DSP in some embodiments for any of the hardware configurations disclosed herein to search in moving mode for the fastest target travelling in a single selected direction, that direction being the same lane as the patrol car is in. Both spectra are searched regardless of which direction the antenna points, but the fastest target is at least limited to having a relative speed slower than the patrol car. Steps 100 through 116 are as previously described.

Step 126 represents the process of searching both the receding and approaching half spectra for the speed of the strongest target having a relative speed less than that of the patrol car thereby automatically eliminating any opposite lane targets all of which have Doppler relative speeds faster than the patrol speed.

Step 128 represents the process of searching both the receding and approaching half spectra for the speed of the fastest target having a relative speed less than that of the patrol car but, in the preferred embodiment, which is also faster than the relative speed of the strongest target. These search criteria automatically eliminate any opposite lane targets all of which have Doppler relative speeds faster than the patrol speed. In alternative embodiments, the limitation that the fastest target must be faster than the strongest target is eliminated as is the entire strongest target search.

Step 130 represents the process of automatically determining whether to add or subtract the fastest target relative speed from the patrol speed based upon whether the fastest target was found in the approaching target spectrum or the receding target spectrum. The appropriate calculation is then performed and the fastest target speed is then displayed. In the preferred embodiment, the strongest target speed is simultaneously displayed, but in alternative embodiments, the strongest target speed display may be eliminated or the entire strongest search may be eliminated and only a fastest target search performed. Optionally, the patrol speed is also displayed to allow the officer to verify that it is correct.

Figure 12:
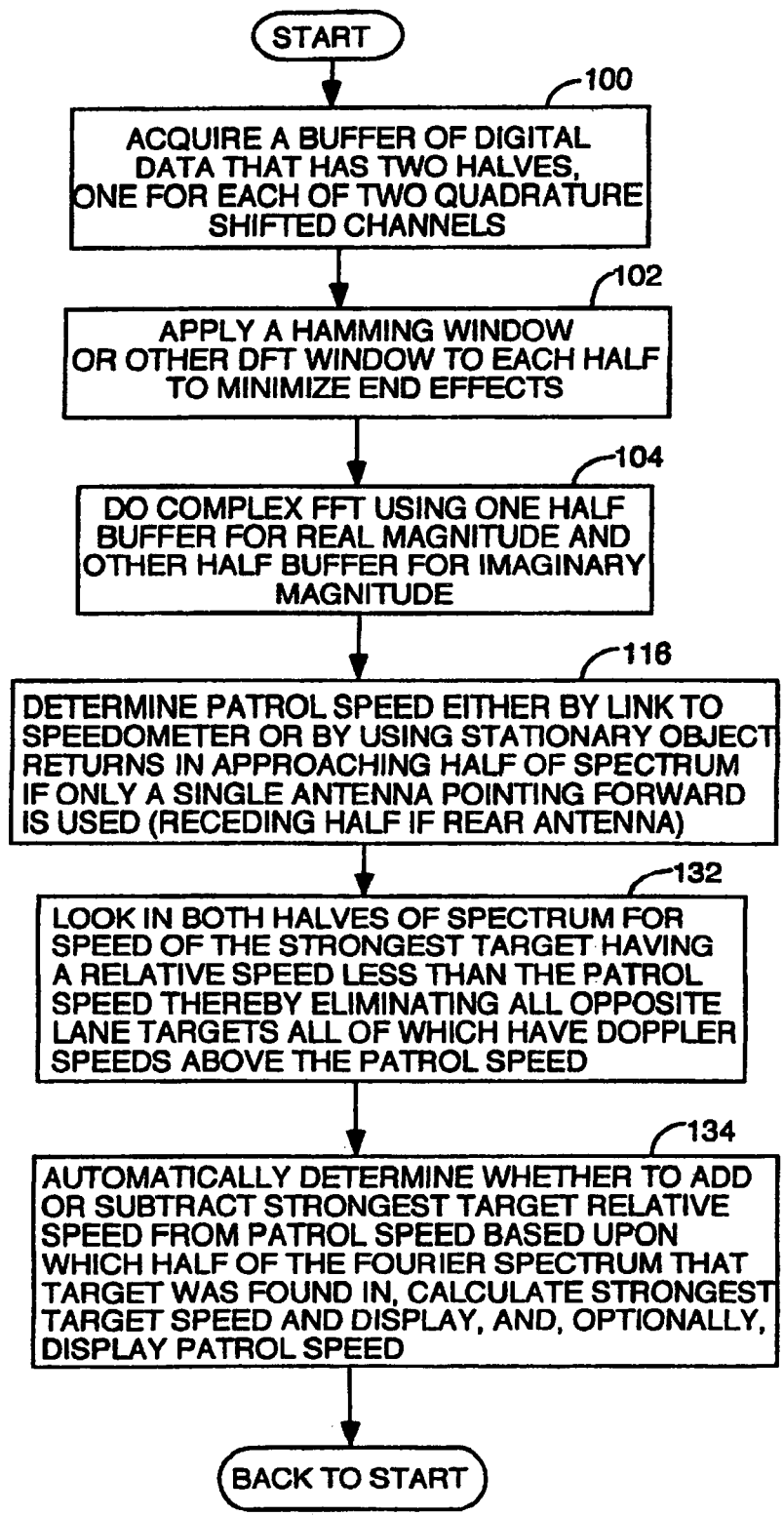
FIG. 12 is a flowchart of a process carried out by the digital signal processor for any of the embodiments of FIGS. 1–4 to implement a single mode, moving, same lane, strongest target search for targets travelling in a single direction with an antenna pointing forward.

FIG. 12 is a flowchart which represents the process carried out by the DSP of any of the hardware embodiments disclosed herein to implement a single mode radar, that mode being moving, same lane, strongest search with an antenna pointing toward the front of the patrol car. Steps 100 through 116 are the same as previously described. Step 132 represents the process of looking in both halves of the spectrum for the speed of the strongest target having a relative speed less than the patrol car speed thereby automatically eliminating any opposite lane targets. Step 134 represents the process of automatically determining whether to add or subtract the strongest target relative speed to or from the patrol speed based upon whether the strongest target speed was found in the approaching target half or the receding target half spectrum. Once that is determined, the strongest target speed is calculated and displayed, and, optionally, the patrol speed is also displayed.

FIGS. 13A through 13M, together comprise a flowchart of a preferred form of two-antenna, digital, complex-FFT, direction-sensing, multimode radar capable of performing all of the searches described in FIGS. 5 through 12 with operator selection of the searches to be performed and the antenna to be used. The class of embodiments represented by FIGS. 13A through 13M are "and" configuration radars in that when fastest searches are performed, a strongest search is always performed first and the fastest target must be faster than the strongest target and the strongest and fastest target speeds are simultaneously displayed. Steps 100 through 104 are the same as previously described to gather two buffers of data from channels A and B, apply a Hamming or other DFT window on each buffer to minimize edge effects and do a complex FFT to generate approaching and receding target Fourier spectra.

Step 140 represents the branching which occurs when the operator chooses either stationary or moving mode using the front panel switches or the remote control. If stationary mode is selected, test 142 is performed to determine if the operator has selected approaching targets only or receding targets only. If approaching targets only is selected, the process of block 144 is performed to sort the targets in the approaching target spectrum into descending order of apparent power.

Step 144 represents the start of the stationary mode, approaching targets only, strongest target search. When the end of this search is reached, the radar will then either also perform a fastest search or not according to operator selection. After step 144, step 146 on FIG. 13D is performed. Step 146 represents the search through the sorted approaching target spectrum (or a copy thereof which has been sorted by power) to find the strongest target candidate not previously processed (by qualifications routines to be described below). In alternative embodiments, the approaching target spectrum is not sorted at all, and the search is performed by simply looking at the apparent power of each target and not selecting it if another target previously examined has a stronger apparent power and continuing this process until every target has been examined. Then this candidate is passed through the qualification procedure, and, if rejected, the process is repeated for the next strongest candidate. In the preferred embodiment, the entire approaching target spectrum is divided into seven sectors and the strongest target is selected from each sector and put into a table of seven strongest candidates. After the table is filled, the table is sorted by descending order of power and the strongest candidate is selected for qualification processing.

The qualification process starts at block 148 where the current strongest candidate is qualified by any known procedures to eliminate it from consideration if it appears to be a false target. The qualification tests can be any combination of the known qualification procedures used in the STALKER DUAL™ dash mounted Doppler police traffic surveillance radar, STALKER™ handheld, digital Doppler digital signal processing (DSP) radar and EAGLE™ dash mounted, digital Doppler DSP series of radars. The minimum qualification test is a signal-to-noise acceptance test but other qualification tests to eliminate the candidate if it appears to be a harmonic, intermodulation product, product of RFI or mobile data terminal operation etc. may also be used.

After doing whatever qualification tests are used, an optional bleed through qualification test represented by block 150 may be performed. The bleed through qualification test eliminates the current approaching target candidate if examination of its paired counterpart in the receding target spectrum indicates the approaching target spectrum is probably the result of bleed through of a strong receding target. The approaching target candidate is rejected if it is not more than 6 dB typically stronger than its counterpart in the receding spectrum. Because of imperfections in the hardware, every Fourier candidate in the approaching spectrum has paired counterpart at the same frequency in the receding spectrum. A strong signal in one spectrum usually has a weaker counterpart false signal in the other spectrum at the same frequency caused by these imperfections. Some harmonics, typically harmonics caused by substantial overloading of the mixer or preamp circuits, have very little directionality and have substantially equal amplitude in both spectra. These harmonics will be eliminated by the process of block 150 as will any harmonic where there is less than 6 dB directionality.

Test 152 is a branching condition to vector processing to step 154 if the strongest approaching target did qualify and vector processing to step 156 if the candidate did not qualify. Step 156 is a test to determine if all strongest approaching target candidates have been processed. If so, processing returns to the start step 99 on FIG. 13A. If not, processing vectors back to step 146 to pick the next strongest approaching target candidate.

Step 154 represents displaying the speed of the strongest approaching target candidate.

Label 156 represents the start of stationary, approaching target only, fastest target searching. Step 157 represents a test to determine whether the operator has selected a fastest search in addition to the strongest search. If so, processing proceeds to step 158. If no fastest search is desired, processing returns to Start at step 99, as symbolized by block 159.

Step 158 represents an optional step of re-sorting the approaching target spectrum (or a copy thereof) into order of descending frequency. The sort is not necessary if the approaching target spectrum was not sorted earlier by descending power or if a copy of it was made and the copy was sorted because the natural order of the spectra output by the complex FFT is in descending order of frequency. Also, this sort step is not required in alternative embodiments where a simple search looking at every candidate in the approaching target spectrum is done with a running tab of the highest frequency candidate found so far until all candidates are examined. The sort is preferred (or use of a linked list of pointers to the candidates with the pointers pointing to the candidates in descending speed order) because then processing can be more easily performed to stop looking for the fastest candidate in top down search order when the speed of the displayed strongest target is reached. The preferred form of processing for step 158 is to set up a do loop to process the candidates in a sorted array or process the candidates pointed to by the pointers in a linked list (other than the pointers to the next link that are required for every linked list) with the limits of the do loop set so as to stop examining fastest candidates when the speed of the displayed strongest target is reached.

Step 160 represents the process of picking the fastest target candidate that has not been previously processed. In the case of the first pass through the loop and a sorted spectrum or sorted array of candidates, this will be the first fastest target candidate in the spectrum or array. On the second pass through, the selected candidate will be the second entry in the spectrum or sorted array. In the case of a linked list, the target pointed by the first link on the list will be selected on the first pass through, and the target pointed to by the second link on the list will be selected on the second pass through. Block 162 represents the optional qualification tests performed on the fastest target candidate to eliminate it from display if it appears to be a false target. In the preferred embodiment, at least a minimum signal-to-noise ratio for the candidate is required and then one or more other known qualification criteria may be also optionally be applied. Any known qualification tests on the fastest candidate may be applied, and exhaustive discussion of the fastest target qualification tests used in the STALKER DUAL™ dash mounted Doppler police traffic surveillance radars in U.S. Pat. No. 5,691,724 is hereby incorporated by reference and represents a preferred species. Many apparent fastest targets are false targets caused by harmonics of the patrol speed or one of the other strong signals in the spectrum or are the sums of any two strong signals in the spectrum called an intermodulation product. Screening to eliminate these false fastest targets represented by optional step 162 is preferred.

Step 164 represents an optional bleed through qualification test. This test is identical to the optional bleed through test performed on the strongest candidates and has the same rationale. If this test is performed, the fastest approaching target candidate will be rejected if its relative power is not at least some predetermined number of dB such as 6 dB greater than its counterpart in the receding spectrum. Test 166 is performed next to determine if the fastest candidate qualified, i.e., passed whatever qualification tests were imposed in the preceding steps. If the current fastest approaching target qualified, processing proceeds to step 170 of FIG. 13L to display the speed of the fastest approaching target candidate along with an optional visual or audible (or both) of target direction. Also, optionally, the speed of the strongest approaching target is simultaneously displayed. Processing then returns to Start block 99 on FIG. 13A.

If the current fastest target did not pass one of the qualification tests, the test of step 168 is performed to determine if any more fastest approaching target candidates are available. If not processing returns to Start block 99. If more fastest approaching candidates are available, processing returns to step 160 to pick the next fastest candidate not already processed and whatever qualification tests are in use are repeated on the new candidate. Eventually, a fastest target candidate will be found and displayed or all candidates will be exhausted and no fastest target display will be put up.

Figure 13A:
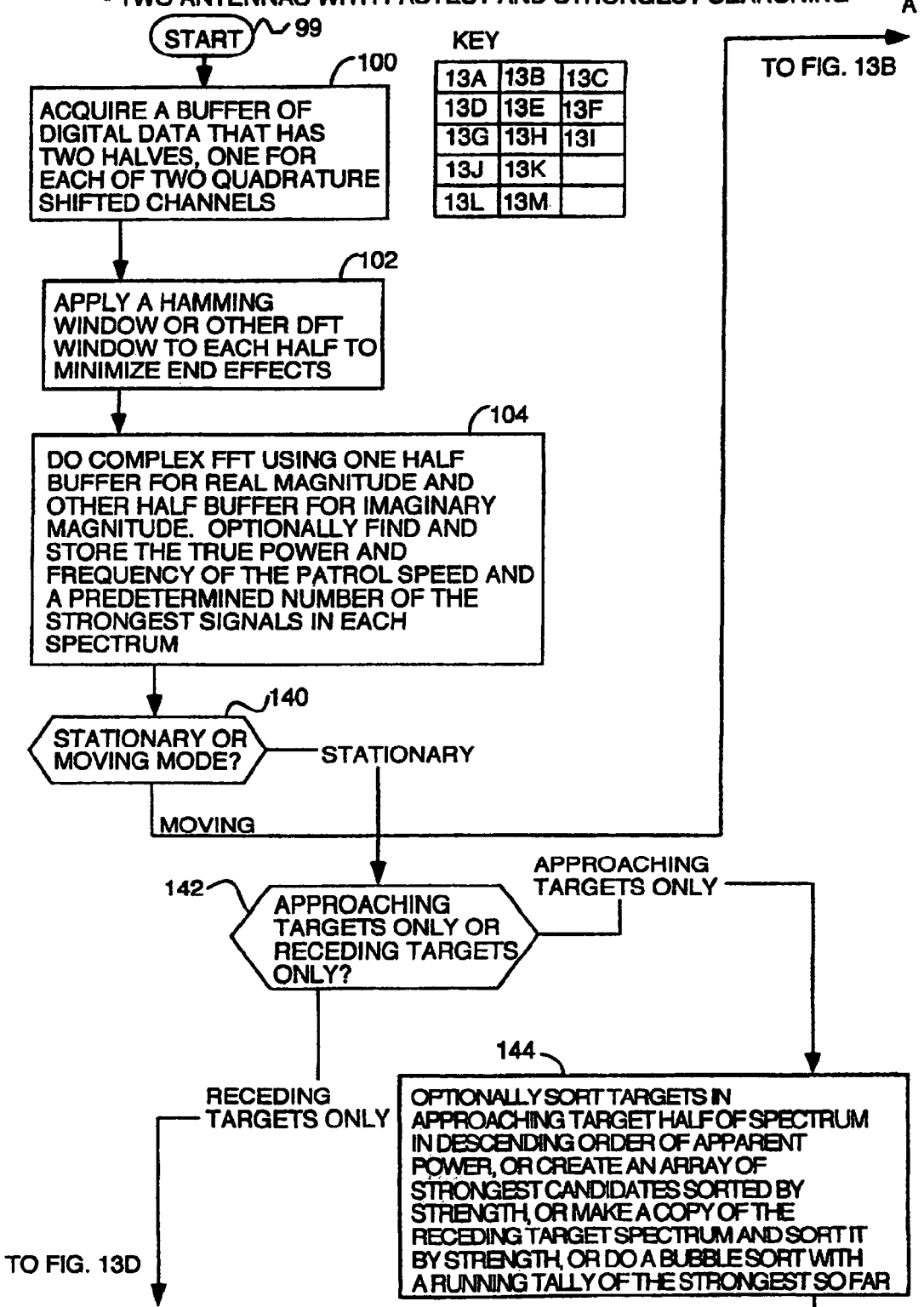

Returning to the consideration of step 142 on FIG. 13A, if the operator selected receding targets only in stationary mode, the strongest and, if selected, fastest processing just described is done on the receding target spectrum. The start of the strongest receding target search is represented by block 172 on FIG. 13D where targets in the receding target spectrum are optionally sorted (or a copy of the receding target array) is sorted in descending order of apparent power. The alternative methods other than sorting mentioned for step 144 on FIG. 13A are equally applicable to step 172.

Step 174 picks the strongest apparent power candidate in the receding spectrum in any one of the different ways mentioned in connection with the discussion of step 146.

The selected strongest receding target candidate is then qualified in step 176 by signal-to-noise ratio and any number (including zero) of other known qualification tests such as harmonic or intermodulation product screening such as are used in the STALKER™ handheld, digital Doppler digital signal processing (DSP) radar, STALKER DUAL™ dash mounted Doppler police traffic surveillance radar or EAGLE™ dash mounted, digital Doppler DSP series of radars to insure the strongest candidate is not a false target. Step 178 on FIG. 13G represents the optional bleed through qualification test which is identical to the test described in step 150 on FIG. 13G except it is performed on receding target candidates and the power of the approaching target spectrum paired entry of every receding target candidate is checked against the power of the receding target candidate.

Next, test 180 determines if the strongest receding target qualified. If so, step 194 calculates and displays the speed of the strongest receding target which qualified. If not, test 182 determines if all strongest receding target candidates have been exhausted. If so, processing returns to Start. If not, processing returns to step 174 on FIG. 13D to pick the next strongest candidate not already processed and start the qualification process.

Label 186 represents the start of stationary, receding target only fastest processing. Test 188 on FIG. 13J determines if the user desires a fastest search. If not, processing returns to Start. If so, block 190 is performed to optionally re-sort the receding target spectrum in descending order of speed stopping at the speed of the strongest displayed receding target thereby eliminating from consideration any receding targets slower than the strongest receding target. The optional forms of processing mentioned in connection with the discussion of block 158 on FIG. 13G are equally applicable for block 190. In the preferred embodiment, the receding spectra is not sorted in step 172 by descending order of power so at step 190, there is no need for a sort since the natural order of both spectra output from the complex FFT is by descending frequency bin. Instead, in the preferred embodiment, an array of strongest candidates is generated by selecting the strongest candidate in each of 7 segments of the receding target spectrum. This array is then sorted by descending power and the candidates selected for qualification tests are selected from the array.

Figure 13B:
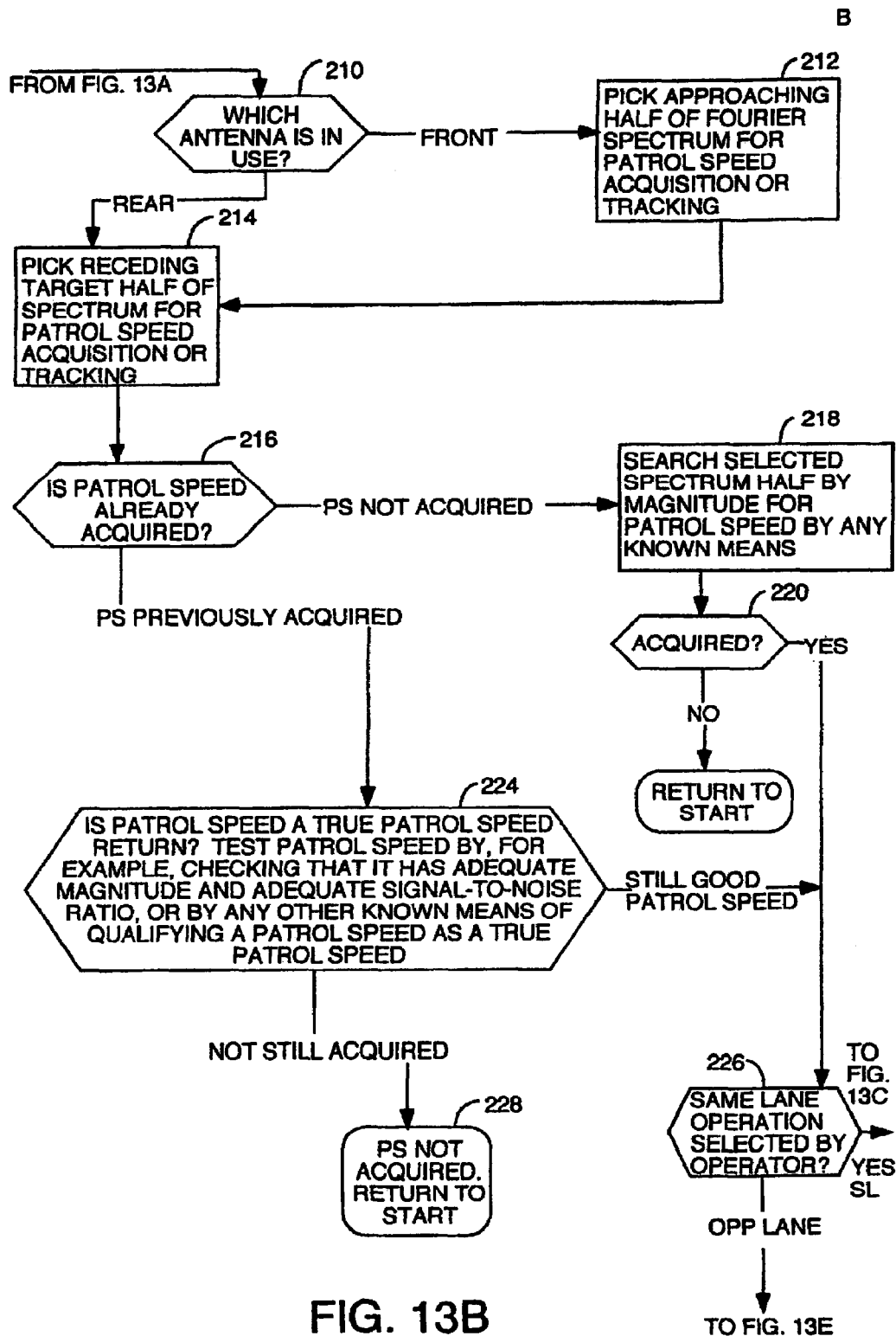
Figure 13C:
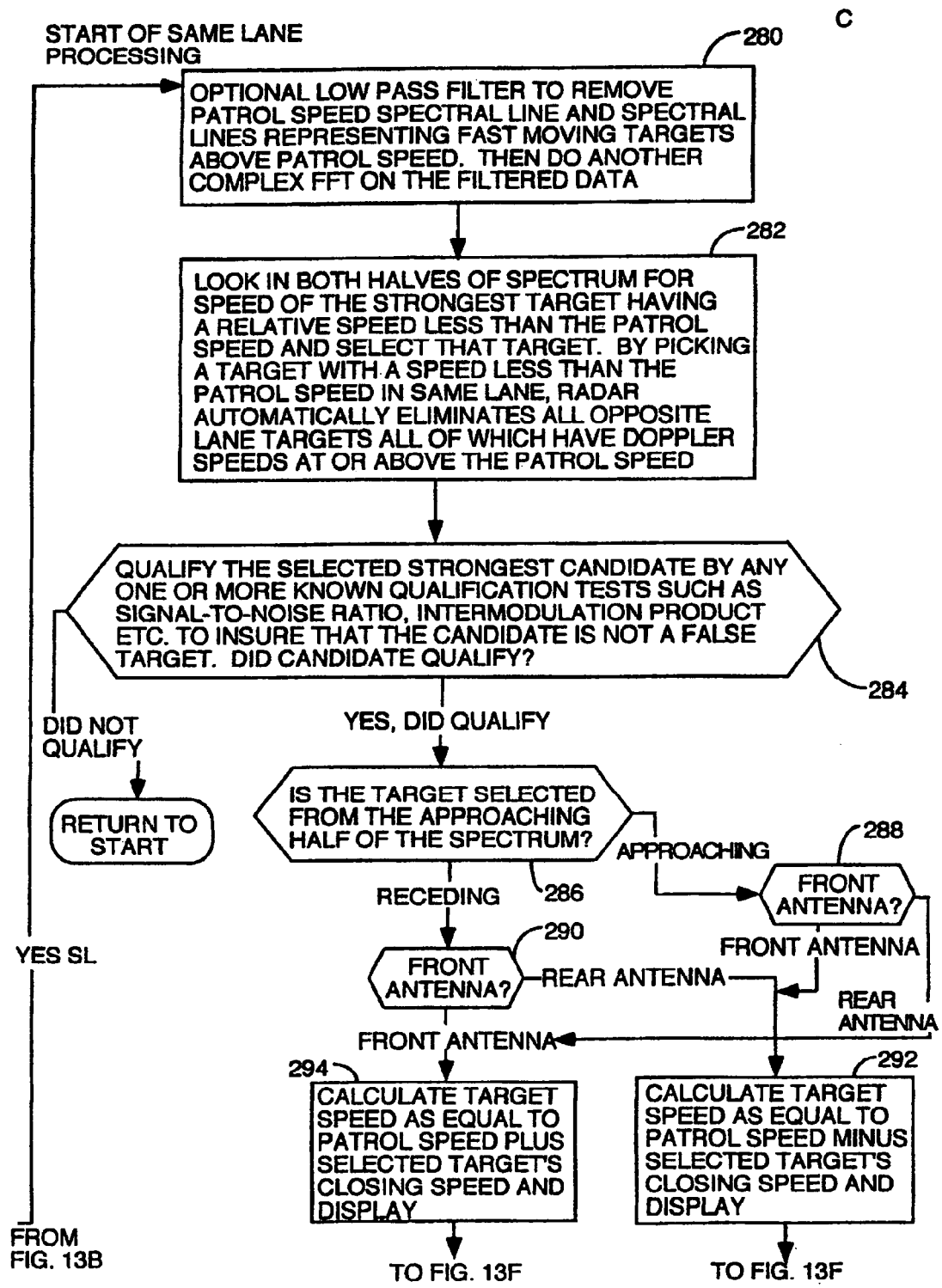
Figure 13D:
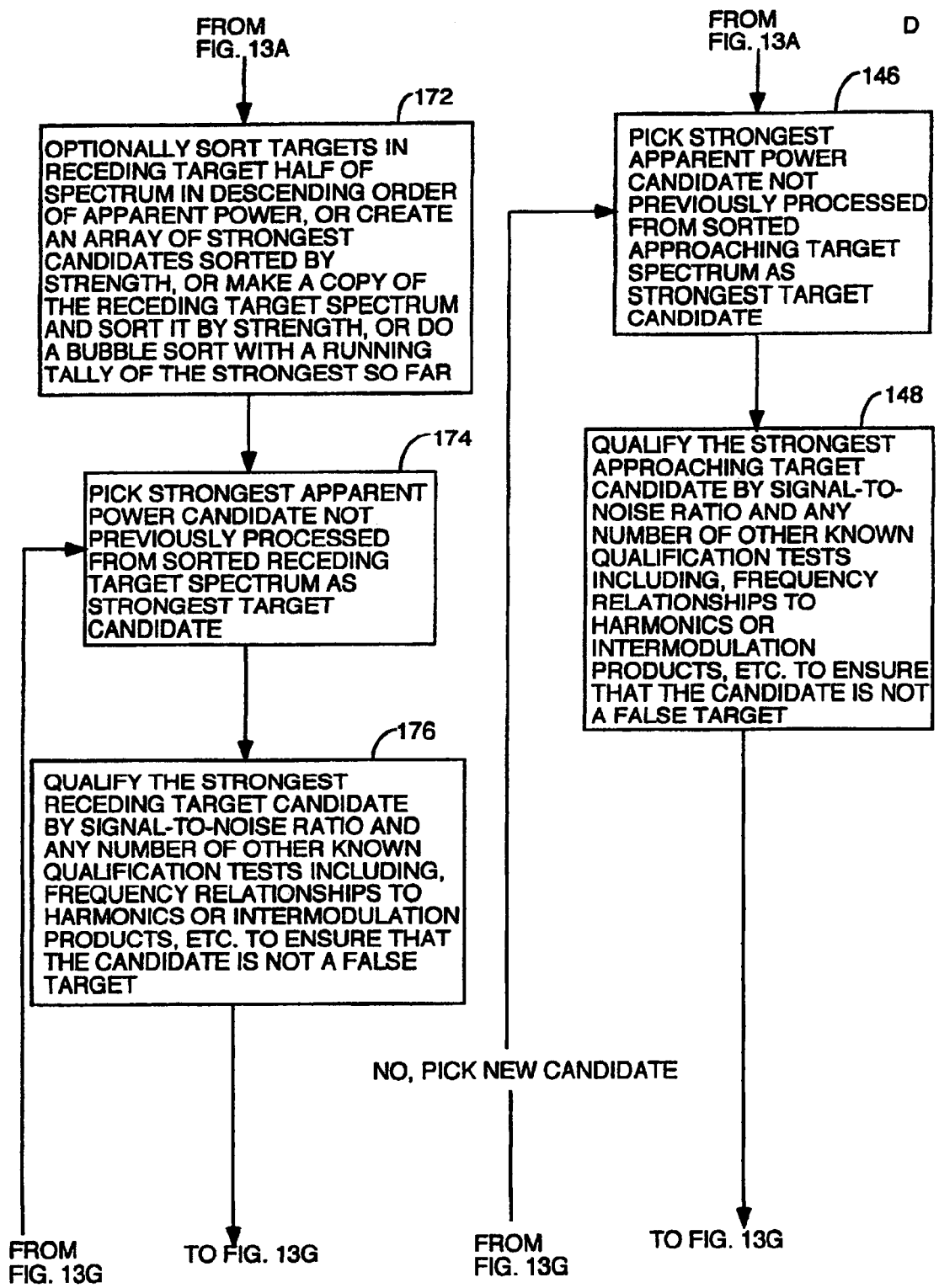
Figure 13E:
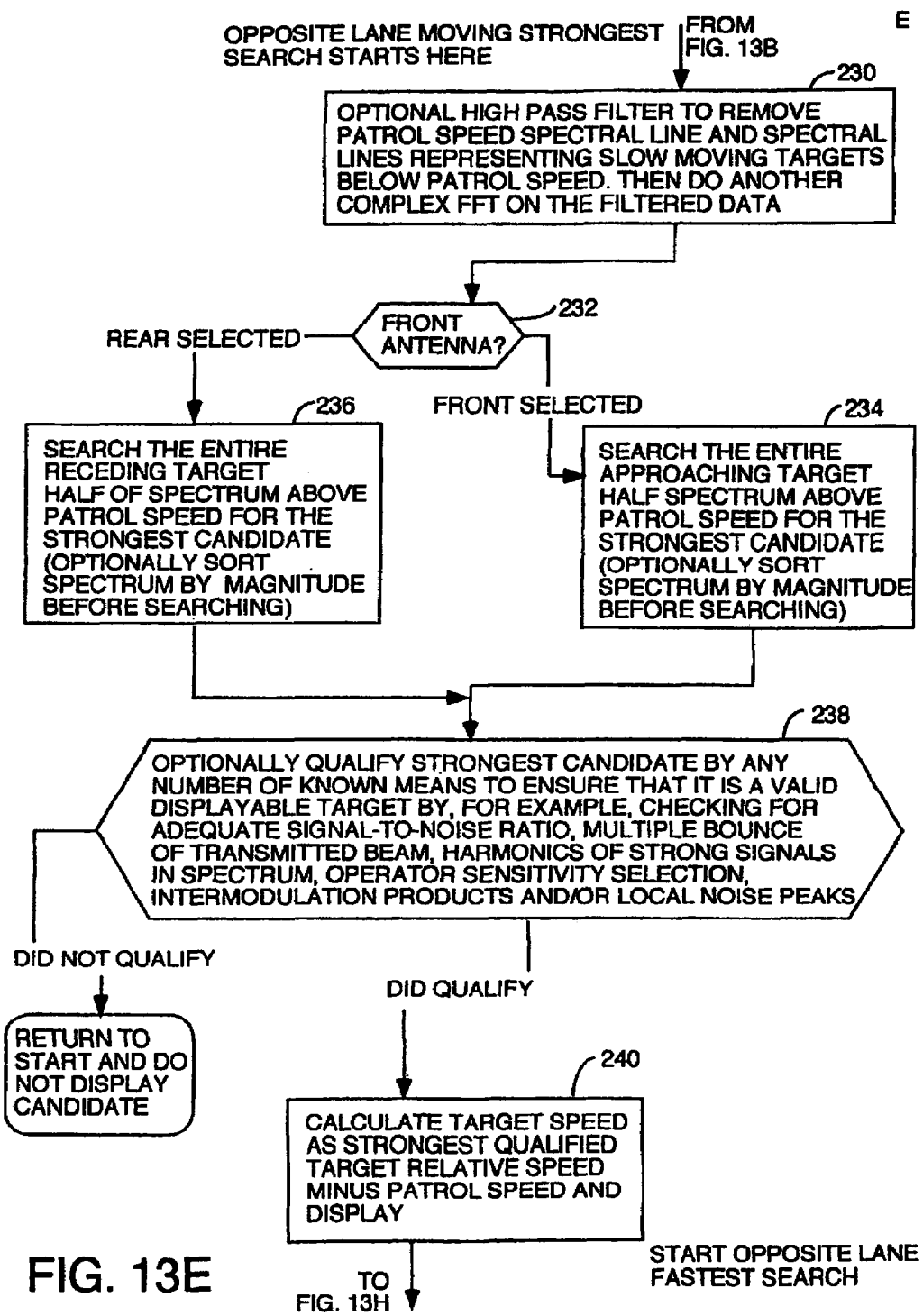
Figure 13F:
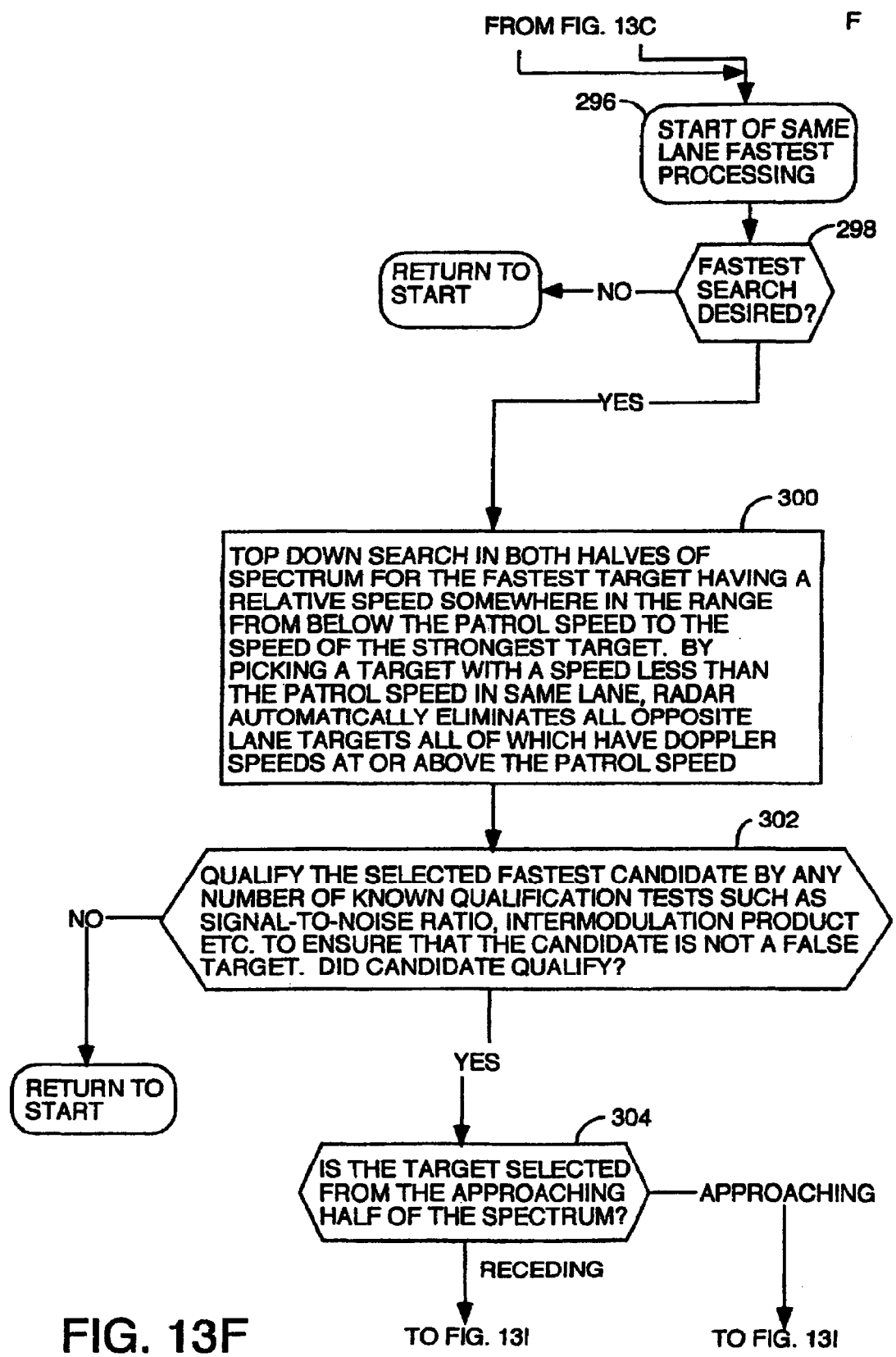
Figure 13G:
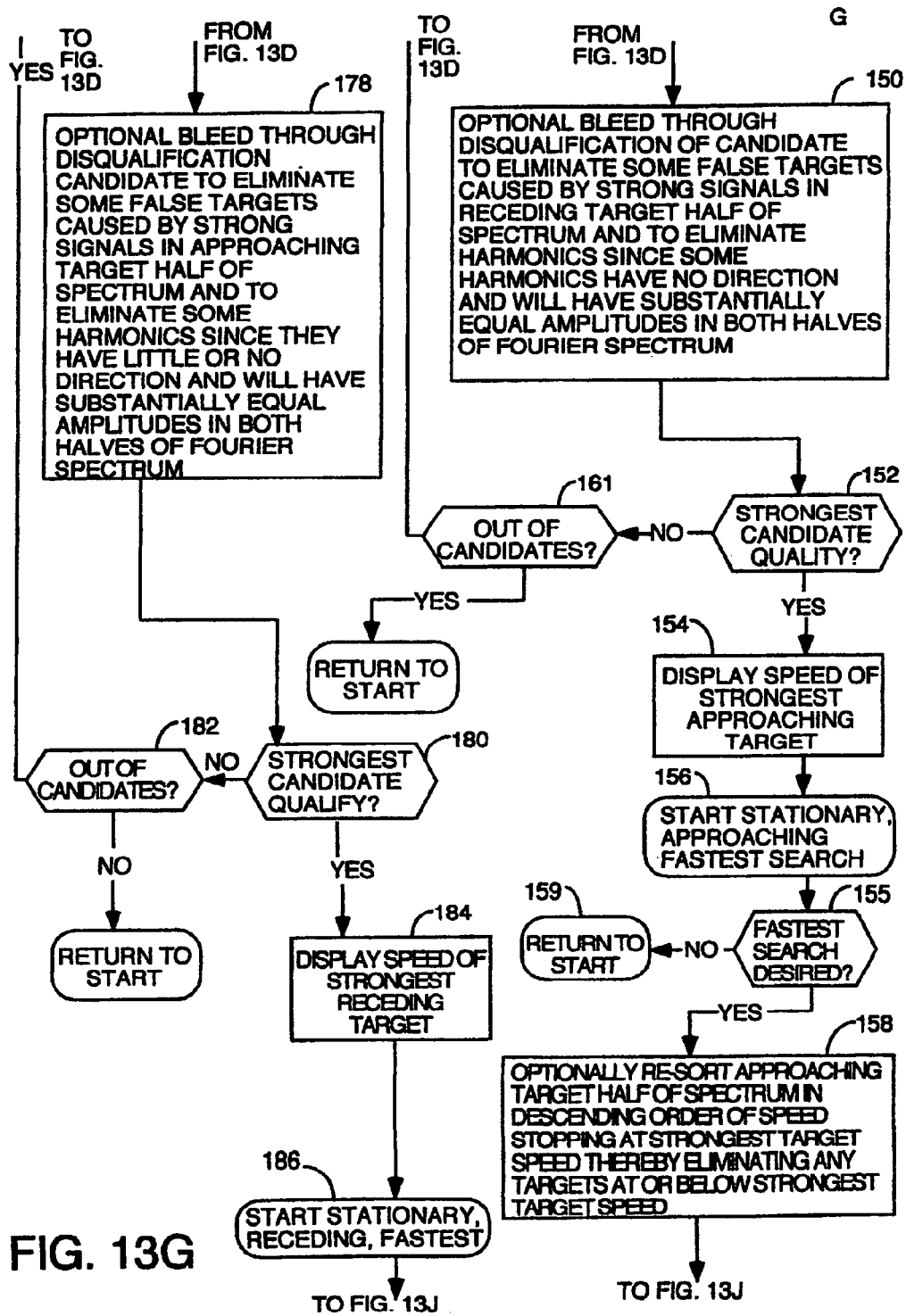
Figure 13H:
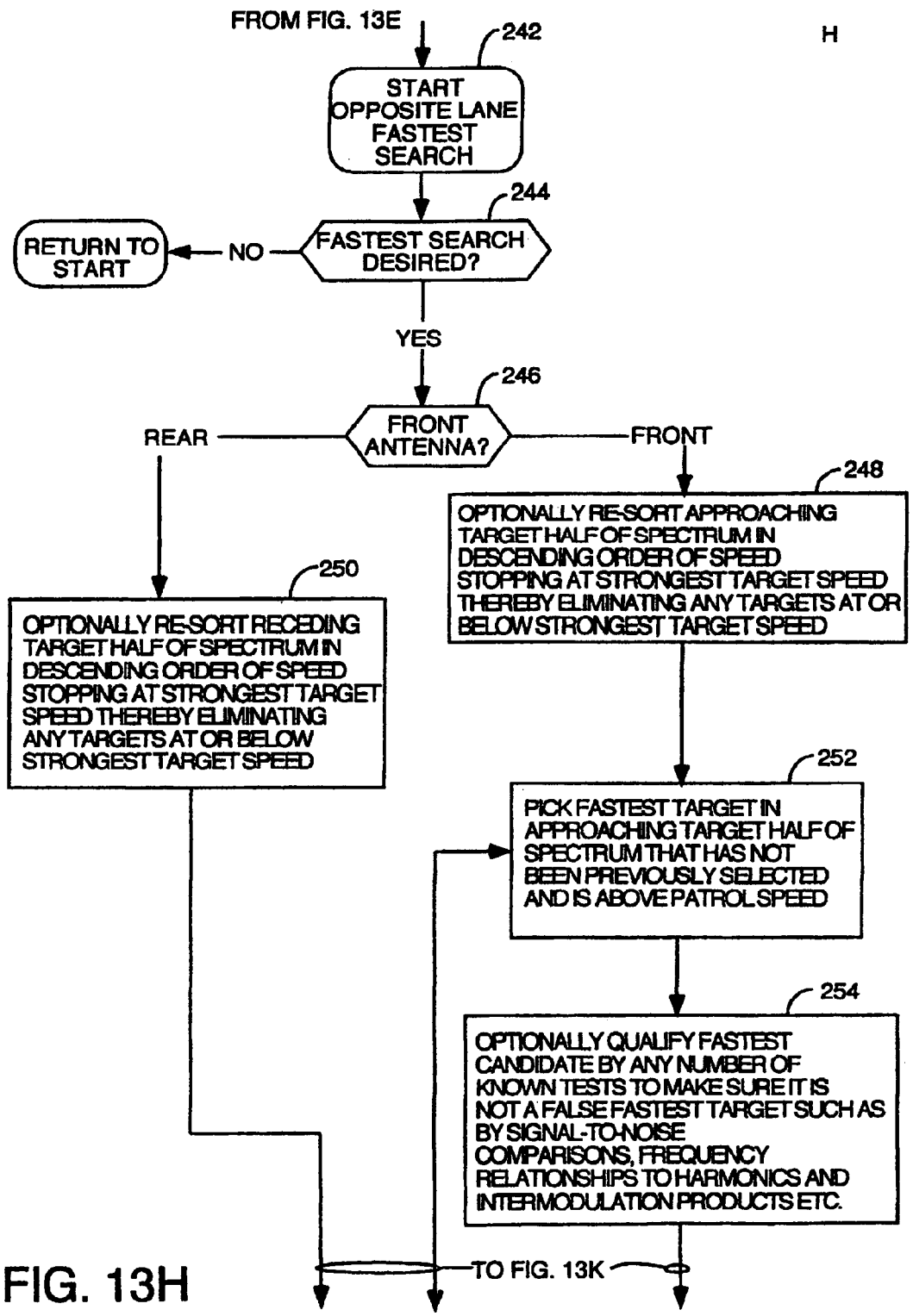
Figure 13I:
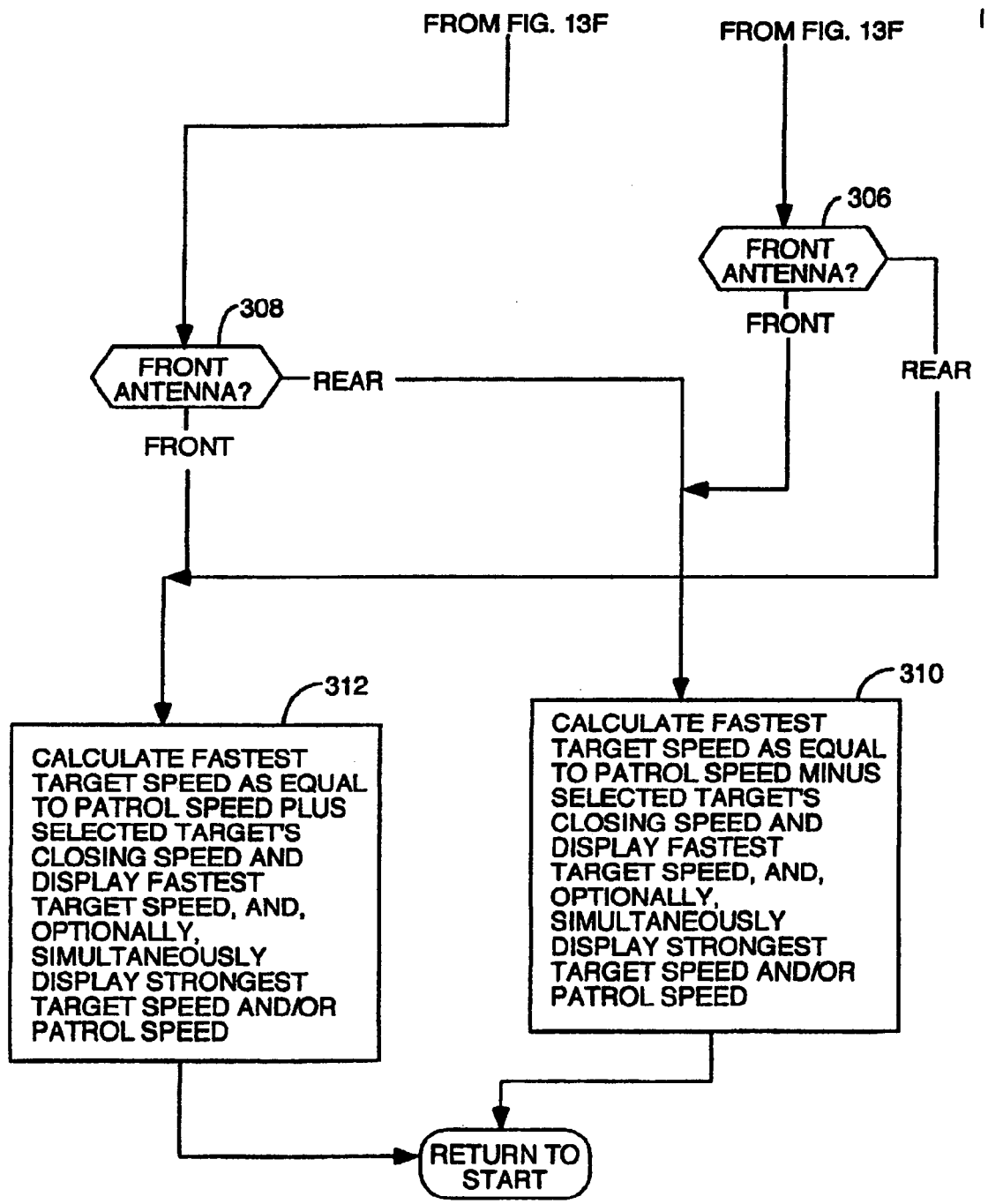
Figure 13J:
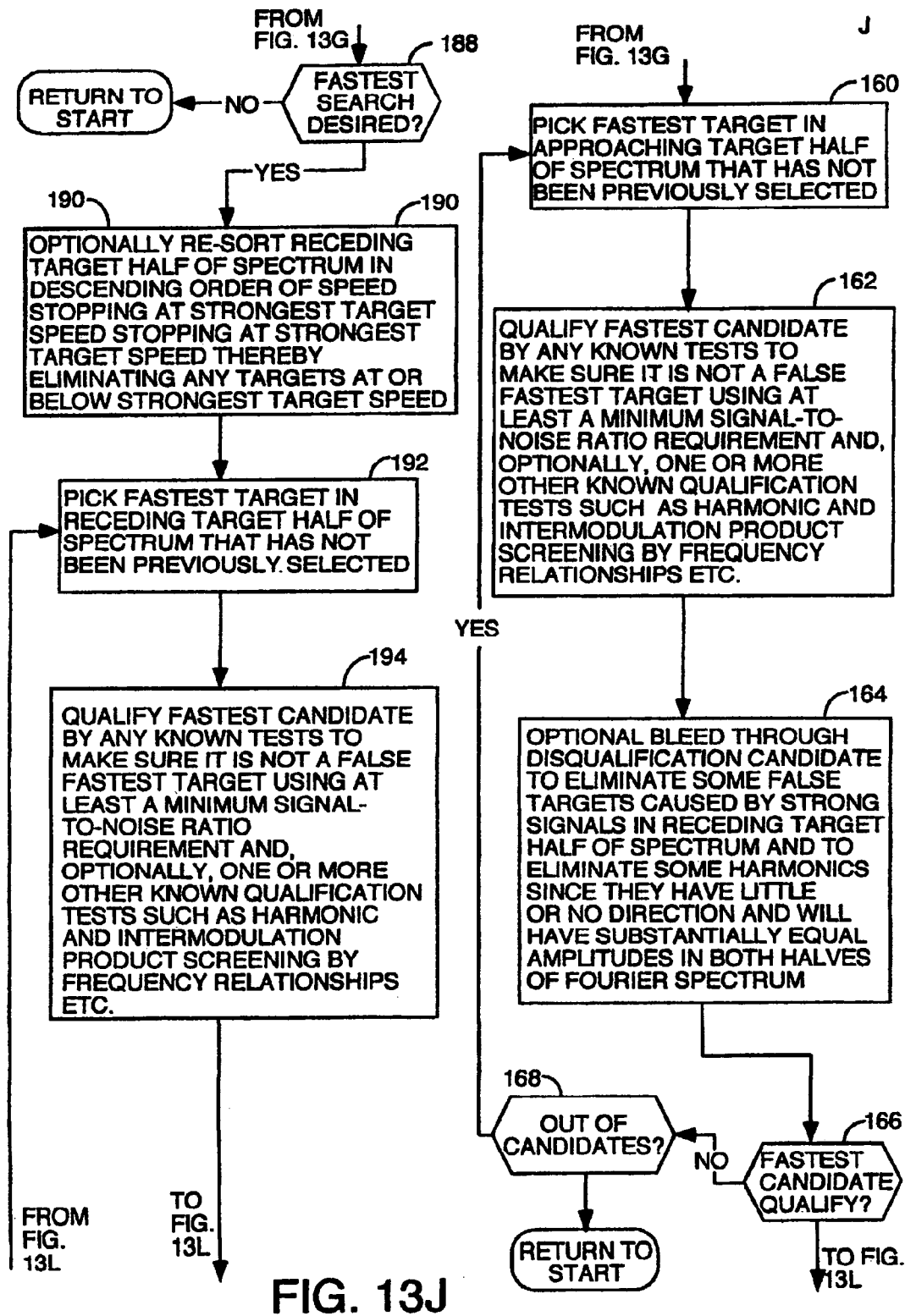
Figure 13K:
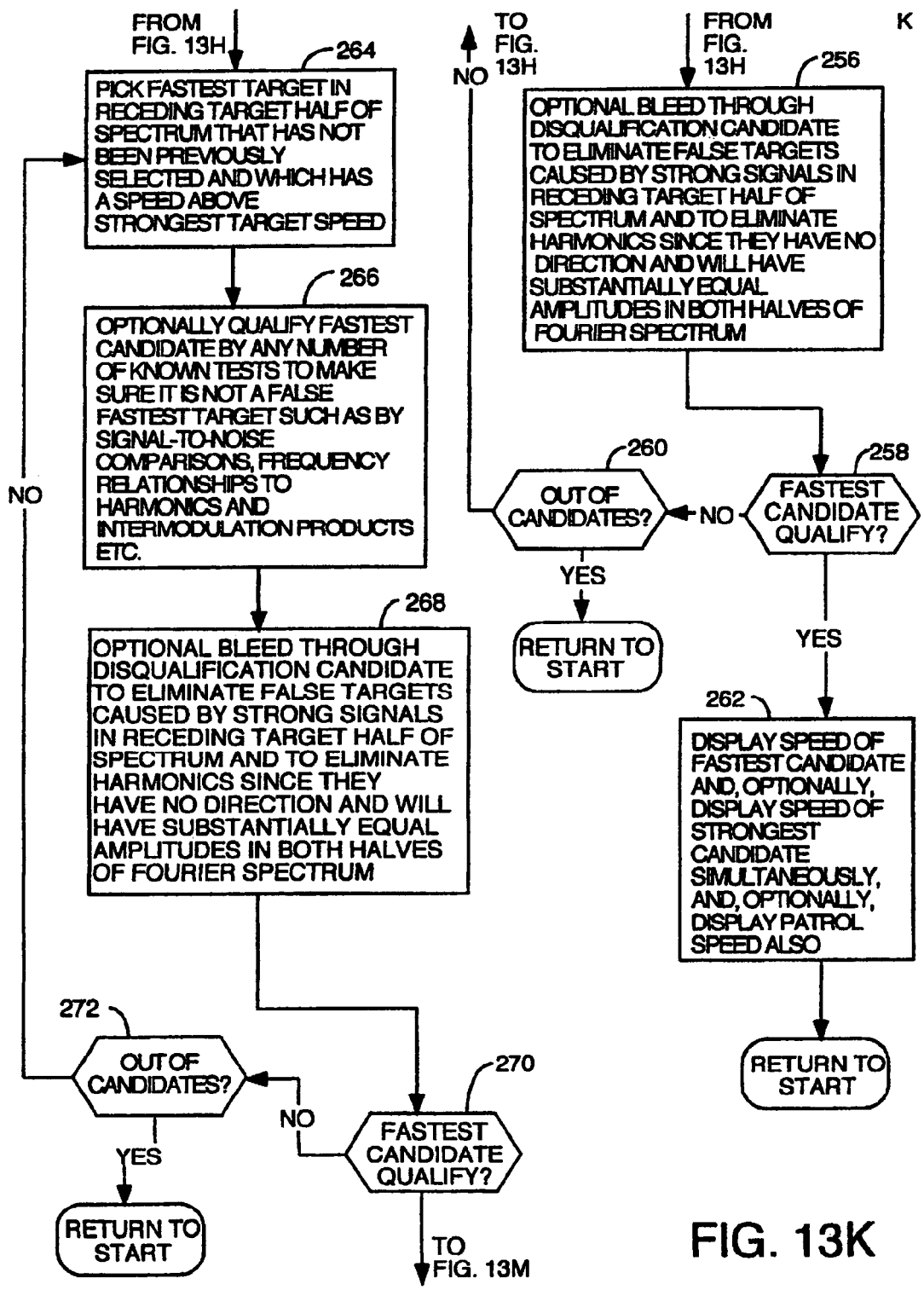
Figure 13L:
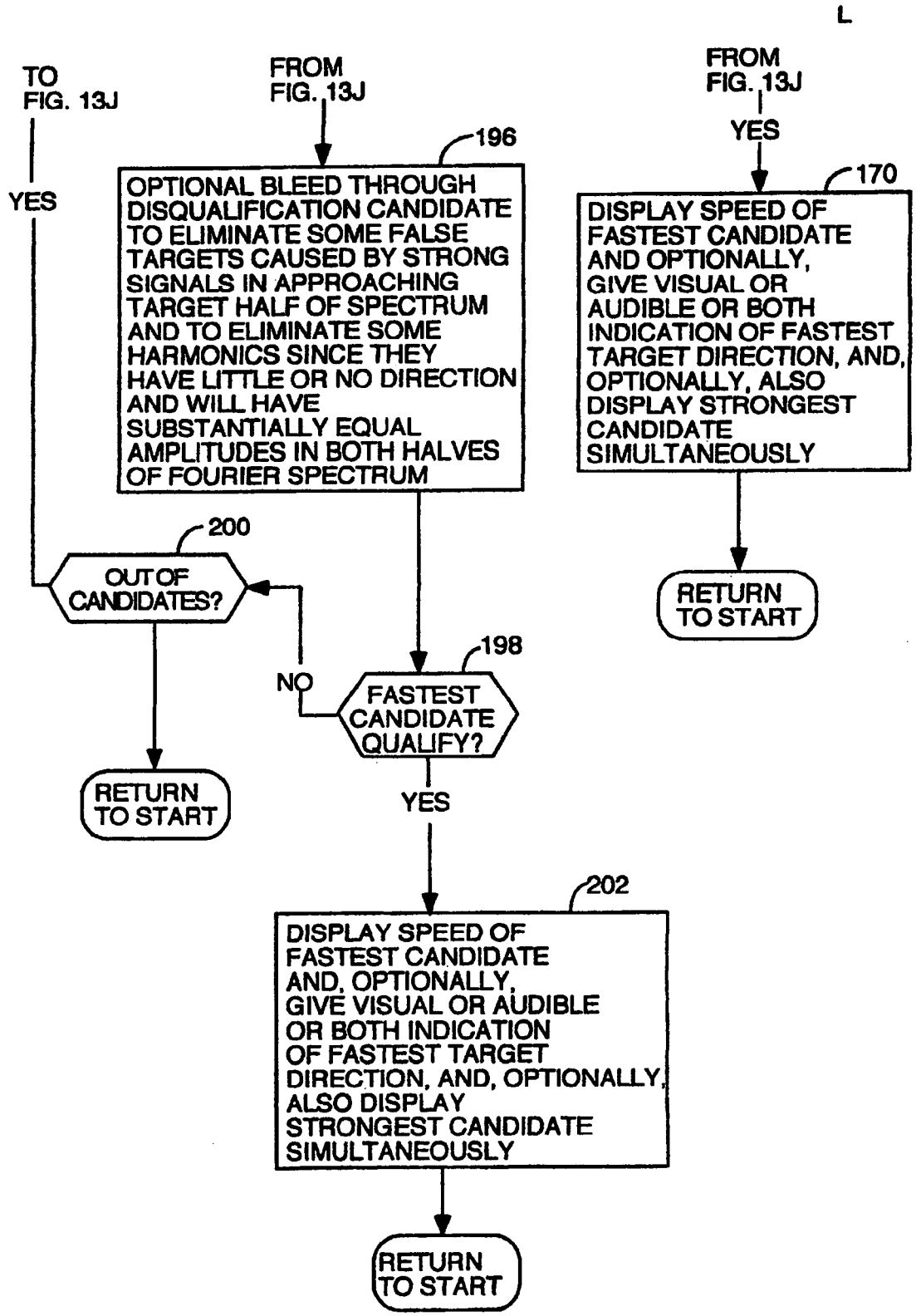

This same sort of processing can be performed in steps 190 on FIG. 13J and 158 on FIG. 13G as an alternative to resorting the entire array. That is, the receding array can be dividing into a number of segments starting at the fastest target and going down to the speed of the strongest target. The fastest target in each of these segments that meets some minimal acceptance criteria can be put in an array which will be naturally ordered by descending frequency, i.e., speed. Alternatively, the array can be generated by screening all candidates in the receding target spectra using some minimum qualification criteria such as minimum signal to noise ratio starting from the highest speed. Each candidate that passes the test goes into the array until the array is full. Then the fastest search is performed out of the array. This latter approach is the preferred approach so as to avoid the time of sorting an entire array or screening every candidate in the array from the fastest down to the speed of the strongest receding target.

Next, in block 192, the fastest target in the receding array is selected in any of the ways described above in connection with the discussion of block 160 on FIG. 13J.

Next, in block 194, the fastest candidate is qualified using at least a minimum required signal-to-noise ratio and, optionally, one or more other known qualification tests such as were used in the STALKER DUAL™ dash mounted Doppler police traffic surveillance radar to qualify a fastest candidate and which are described in U.S. Pat. No. 5,691,724. Comments about block 162 are equally applicable to block 194.

Next, an optional bleed through test of block 196 is performed. This test is identical to the test of block 164 on FIG. 13J except that the elimination of the fastest receding target candidate occurs if its power is not more than a predetermined amount, typically 6 dB, greater the apparent or relative power of its paired counterpart in the approaching target spectrum. Again, some harmonics with insufficient directionality are eliminated.

The optional bleed through tests represented by blocks 150, 178, 196 and 164 all have the advantage of automatically eliminating some false targets with insufficient directionality (less than 6 dB difference between spectra) and eliminating some harmonics since some harmonics have no directionality. Specifically, harmonics caused by signals that are just starting to overload still have some directionality. Harmonics caused by signals that are substantially distorted by significant overloading of the radar mixer or preamplifier circuits have much less directionality. Because some harmonics have little or no direction, their components in the approaching and receding spectra will have substantially equal power thereby eliminating any such harmonic from qualification as a valid target.

Test 198 determines if the fastest receding target candidate currently being processed passed whatever qualification tests are being performed. If so, block 202 represents the process of calculating and displaying the speed of the fastest candidate, and, optionally, giving a visual or audible (or both) indication of the target direction, and, optionally, also displaying the strongest receding target speed simultaneously. If the current fastest target candidate did not qualify, test 200 is performed to determine if all candidates have been exhausted. In the preferred fastest search this will be an examination of whether the fastest candidate that just failed, was the last fastest candidate in the top down search having a speed just above the speed of the strongest receding target previously located. In embodiments where a table of fastest candidates is created, the table will not include any fastest candidate having a speed slower than the speed of the strongest candidate. In these embodiments, test 200 is simply an examination of whether the last candidate in the table has been processed. If there are no more candidates, processing returns to Start without displaying any fastest candidate and the process starts over with new data. If there are more fastest receding candidates, processing returns to step 192 on FIG. 13J to pick the next candidate and start the qualification process on it. Eventually either a fastest candidate will be found or the process will exhaust all candidates and start over with new data and repeat the strongest search and repeat the fastest search if the operator switch positions indicate a fastest search is still desired.

Returning to the consideration of step 140 on FIG. 13A, if the operator selected moving mode, test 210 on FIG. 13B determines whether the front or rear antenna has been selected and vectors processing accordingly. If the front antenna has been selected, block 212 starts patrol speed processing to acquire or track the patrol car speed from stationary returns in the approaching half spectrum only. If the rear antenna is selected, block 214 starts patrol speed processing out of the receding target spectrum only. By using stationary returns from only one spectrum, the problem of false acquisition of patrol speed when a patrol car pulls up to a stop sign or light behind another car using the front antenna and falsely acquires that car's speed as patrol speed when the other car pulls away from the stop.

In species within this multimode genus which use a "hardwired" link to the speedometer via transducer 59, the processing of blocks 212 and 214 and the blocks described below pertaining to patrol speed processing of stationary target returns are replaced with a process to read the transducer and calculate the patrol speed from data acquired from it.

Test 216 determines whether patrol speed has already been acquired, and if not, vectors processing to block 218 where the selected spectrum is searched in any known way for a new patrol car groundspeed return. This search can be a search for the strongest signal which has a characteristic asymmetry as is done in the EAGLE™ dash mounted, digital Doppler DSP series of radars or it can be a search for the strongest return that has an acceptable signal-to-noise ratio on the higher frequency side only as is done in the STALKER™ handheld, digital Doppler digital signal processing (DSP) radars. If patrol speed was previously acquired, test 224 is performed to determine if it is a true patrol speed return by, for example, determining if it has adequate magnitude and adequate signal-to-noise ratio or by any other known way of qualifying a return as a true patrol speed. In the STALKER™ handheld, digital Doppler digital signal processing (DSP) radars, the patrol speed candidate is also tested to see if it is the same patrol speed acquired during the last loop for a certain time window. If patrol speed is changing, this will eventually cause a failure of the patrol speed previously acquired to match a new patrol speed candidate the selection of which is symbolized by step 214 or 212. If the previously acquired patrol speed fails to remain qualified, block 228 transfer control back to Start and sets a flag that there is no previously acquired patrol speed thereby causing the radar to reacquire a fresh patrol speed.

If test 224 determines that the previously acquired patrol speed is still qualified, processing is vectored to test 226 to determine if the operator has selected same lane or opposite lane processing.

After a new patrol speed candidate has been selected by block 218, test 220 determines whether it qualifies under any known tests for qualifying a patrol speed candidate. If the candidate does not qualify, processing returns to Start. If the candidate does qualify, test 226 is performed.

If the operator has selected opposite lane, optional step 230 may be performed to pass each of the two buffers of data through a digital high pass filter to remove the patrol speed spectral line therefrom. The filtered data resulting from the digital filtering operations on the two original buffers is stored in two new filtered data buffers. Also, targets slower than patrol speed will also be removed by this process. If the high pass filter step is performed, another complex FFT is performed on the filtered data buffers.

Either way, test 232 is then performed to determine if the front antenna or rear antenna has been selected. Block 234 is performed if the front antenna has been selected to search the approaching target spectrum for the strongest target having a relative speed above the patrol speed. All targets in the opposite lane will have a relative speed above the patrol speed regardless of their actual speed. The search for the strongest of 234 can take any known form. For example, the approaching target spectrum (or a copy thereof) can be sorted by descending order of strength and the strongest target not previously processed picked for qualification. Also, the selected spectrum may be divided into segments, and each segment can be searched for its strongest candidate and the results placed in a sorted table. Or, preferably, the entire spectrum can be searched in a form of bubble sort to find the strongest and then the next strongest and then the next strongest until a desired number of candidates is found. Those candidates can be put in a sorted table, and picked one at a time for the qualification process.

The process of looping to the next strongest candidate in case the current candidate does not qualify and attempting to qualify the next strongest candidate is not shown, but may be performed in alternative embodiments.

Next, optional qualification tests represented by block 238 are performed. As in the case for stationary mode, it is preferred to employ at least a minimum acceptable signal-to-noise ratio qualification test to avoid processing weak, noisy signals. In the preferred embodiment, a battery of qualification tests known from the STALKER™ handheld, digital Doppler digital signal processing (DSP) radar and STALKER DUAL™ dash mounted Doppler police traffic surveillance radars is performed on the strongest moving mode opposite lane candidate to insure it is a valid target such as multiple bounce screens, harmonics of other strong signals, spectrum operator sensitivity selection screening, intermodulation products and tests to insure that there is no local noise peak that is too close to insure an accurate reading. In alternative embodiments any number (including zero) of known qualification tests may be employed.

In the embodiment shown, if the strongest candidate did not qualify, processing returns to start without displaying a strongest target speed. In alternative embodiments, a new, next strongest candidate can be picked and subjected to the qualification tests of block 238 and this process can be repeated until a candidate is found which either qualifies or all candidates have been exhausted, in which case processing returns to Start.

If the strongest candidate qualifies, step 240 is performed to calculate its speed by taking the candidate's relative speed and subtracting from it the patrol speed. The result is displayed with an optional visible or audible reminder that it is opposite lane.

Step 242 represents the start of opposite lane fastest search processing. Test 244 determines whether the operator desires a fastest target search. If he or she does not, processing returns to Start. If a fastest search is requested, test 246 determines whether the operator has selected the front or rear antenna. The process of block 248 is optionally performed if the front antenna has been selected to resort the approaching target spectrum in descending order of speed but stopping at the speed of the strongest opposite lane target currently being displayed. This is done because in this particular species, the fastest target must be faster than the strongest target being displayed. This re-sorting step is only one way of starting a fastest search. If the two spectra output by the complex FFT were not sorted by descending order of strength in the strongest search and the moving mode opposite lane strongest search was done in any of the other ways described above, or if a copy of each spectra was made and the copy was sorted, there is no need to re-sort the spectra in steps 248 and 250 since their natural order when output by the DSP after the complex FFT is sorted by descending order of frequency. Step 250 is optionally performed to re-sort the receding target spectrum into descending order of frequency under the above defined conditions if the rear antenna was selected. Steps 248 can also represent the process of building a table of fastest candidates by searching the appropriate approaching or receding spectrum to find the fastest candidate, then the next fastest and the next fastest and so on until the table is filled. A table filled in this manner will be naturally sorted by descending order of speed.

The preferred embodiment of implementing steps 248 and 250 are to fill an approaching target table with 7 fastest candidates and to fill a receding target table with 7 fastest candidates in the following manner. First, the value of a rolling noise floor calculated as the average apparent power of the signals in the top 64 bins is calculated and stored as BLOCKNOISESUM. Second, a test is performed to determine if a valid strongest target has been found. If not, processing returns to Start without ever searching for fastest candidates or qualifying one. If a valid strongest target has been found, then processing proceeds to set up a do loop that has the number of cycles from the top frequency bin to the bin of the strongest signal currently being displayed. The iteration count is then set to zero and a pointer is set to the location of the top frequency bin and the apparent or relative power of the signal in the top frequency bin is read from the appropriate approaching or receding spectrum (only one spectrum is used and which one is used depends upon the antenna selection). The candidate is then screened to determine if its apparent power is down by more than some selected number of dB from the strongest signal's relative power as an initial acceptance criteria. If it is, the candidate is rejected, the pointer is incremented, and the apparent power of the next candidate is retrieved and subjected to the initial acceptance criteria. If not, then the bin number of the candidate is stored in the highest speed position in the table and a signal strength field is filled in with the apparent power of the candidate plus the apparent power in the bins on either side of it. The local noise floor BLOCKNOISESUM is stored in another field in the table associated with this candidate, and the rolling noise floor calculation is repeated by removing from the 64 bin sum the apparent power in the top bin and adding the apparent power from the bin just below the top 64 bins. The rolling noise floor is recalculated each time the pointer is incremented by subtracting the top bin and adding one more bin just below the bottom of the 64 bins. Then the next bin down has its apparent power retrieved and subjected to the initial qualification test. When 7 candidates have been found in this way, each candidate is subjected to a local noise maximum test and noise-to-signal calculation against any local noise peak and a maximum noise-to-signal ratio test using the candidate's BLOCKNOISESUM value. The N/S ratios calculated are stored in the table. These two tests are described in the STALKER DUAL™ dash mounted Doppler police traffic surveillance radar patent, U.S. Pat. No. 5,691,724. All the fastest searches in all the modes described herein can work in this manner in some embodiments to develop fastest candidates.

After step 248, step 252 picks a fastest target candidate either from the sorted approaching target spectrum or from a table of fastest candidates built in any known manner. Block 254 optionally qualifies the fastest candidate in any known manner using any number (including zero) of known qualification tests such as the ones described in the STALKER DUAL™ dash mounted Doppler police traffic surveillance radar patent or some subset thereof. False fastest targets frequently occur as a result of second or third harmonics of the patrol speed or other strong signals in the spectrum or intermodulation products in the form of the sum of strong signals in the spectrum. It is preferred to screen each fastest candidate at least for false targets caused by intermodulation products. Harmonic screening is not actually necessary if a bleed through qualification test (discussed next) is used, because of the fact that only one spectrum is being searched and all harmonics will fail the bleed through test since they have no directionality.

Next an optional bleed through test is performed that is identical to the bleed through tests described for stationary fastest searches, as represented by block 256. Test 258 determines if the fastest candidate qualified. If not, test 260 determines if there are more fastest candidates, and vectors processing back to step 252 if there are. If there are no more candidates, return to Start. If the fastest candidate qualified, block 262 displays its speed, and optionally displays the strongest target speed and/or the patrol speed simultaneously. Optionally, a visible or audible (or both) indication of the target direction may also be given to remind the officer which mode he is in. Then processing returns to Start.

Returning to consideration of step 246, if the rear antenna is selected processing of the fastest mode is identical to the fastest processing just described except that the target candidates are taken out of the receding target array. Accordingly, steps 250, 264, 266, 268, 270, 272 and 278 are performed and their processing and various alternative embodiments are the same as previously discussed with respect to their counterpart steps in the moving mode, opposite lane, fastest search processing.

Returning to the consideration of step 226 on FIG. 13B, if the user selected same lane, processing vectors to step 280 on FIG. 13C. Step 280 represents an optional low pass digital filtering step to remove the patrol speed spectral and spectral lines for fast moving targets having relative speeds above the patrol speed. These targets having a relative speed above patrol speed represent opposite lane targets which the officer does not wish to consider to aid in target identification in a multitarget environment. If a low pass filtering step is performed, another complex FFT is calculated on the filtered digital data.

Next, step 282 is performed to search both the approaching and receding spectra for the speed of the strongest target having a relative speed less than the speed of the patrol car. The manner in which this strongest target is located can be any known manner of doing a strongest target search in a Fourier spectrum such as the methods described earlier herein for either the stationary strongest or moving, opposite lane strongest searches. For example, the approaching and receding spectra, or copies thereof, can both be sorted by decreasing order of apparent power (relative signal magnitude), or they can be divided into segments and the strongest target from each segment may be selected and put in a table, or a table may be built by a bubble sort or other "this is the strongest target I have found so far" type search where some number of strongest candidates are found by comparing the magnitude of each candidate to the highest magnitude candidate found so far and replacing the "king of the hill" candidate with any stronger one found and repeating this process until the 7 strongest candidates have been found. These 7 candidates are then stored in a table which is naturally sorted by decreasing magnitude and the candidates are processed by the optional qualification tests represented by 284. The table is built by searching both spectra for the strongest signals but only accepting signals with relative speeds greater than the patrol speed to eliminate all opposite lane targets. The table also includes a field for each candidate that indicates whether that candidate came from the receding target spectrum or from the approaching target spectrum. In some embodiments, such as the embodiment depicted by blocks 282 and 284, only the strongest target is picked and if it fails to qualify, processing returns to Start without finding a strongest target.

In the preferred embodiment, step 282 represents a process of building a table of strongest candidates in the manner described in the paragraph next above with each candidate subjected to an initial noise-to-signal screening before it gets into the table. Test 284, in the preferred embodiment represents a process of screening each candidate in the table, starting with the strongest, to any number of known qualification tests until one is found that passes all tests or until all candidates are exhausted. If all candidates are exhausted without a qualifier, processing returns to Start to collect new data.

Test 286 represents a test to determine if the strongest target which qualified came from the approaching target spectrum or the receding target spectrum. If it came from the approaching target spectrum, test 288 is performed to determine if the front antenna has been selected. If the qualified strongest target came from the approaching spectra, and the front antenna is selected, the target speed calculation of block 292 is by subtracting the target's relative speed from the patrol speed and displaying the result. The calculation and display of block 292 is also performed if the qualified strongest target came from the receding spectrum and the rear antenna was selected.

If the qualified strongest target came from the approaching target spectrum and the rear antenna was selected, the calculation of block 294 is performed. Block 294 calculates the qualified strongest target's speed as the patrol speed plus the relative speed of the target and displays the result. This same processing is performed if the qualified strongest candidate came from the receding target spectrum and the front antenna was selected.

The advantage of the direction sensing capability of the radar in the same lane strongest and fastest modes is that there is no need for the officer to make a judgment as to whether the target he is tracking is going faster or slower than the patrol car. In prior art radars, the officer had to make this judgment and press a button so as to tell the DSP to add or subtract the relative target speed to or from the patrol speed. For targets which are far away, this is not always easy and can result in erroneous target speed readouts.

Label 296 is the start of same lane fastest mode processing. Test 298 determines whether the operator has selected same lane, fastest mode. If not, processing returns to Start. If so, the process of block 300 is performed. Block 300 represents a search of both the receding and approaching target spectra for the fastest target having a relative speed below the speed patrol and above the speed of the strongest same lane target previously found. This search can be done in any manner, but if both arrays are already ordered in descending order of frequency or are sorted to have that order (or copies thereof are sorted by decreasing frequency), then the search is a top down search. A top down search is preferred because it is easier to determine the number of iterations of a do loop needed to look at all bins below the patrol speed but above the strongest target speed. If the spectra are not ordered by decreasing frequency, every bin in the spectra must be searched and its frequency compared to the frequencies of the strongest target and the patrol speed and the frequency of the fastest target found so far. The only way to know when the fastest target in the stated range is found is to search every bin of both spectra. This can result in more processing than is done if the spectra are sorted or if a table of fastest candidates is built all of which are in the stated speed range. In the preferred embodiment, block 300 represents a process of building a table of 7 fastest candidates just like the preferred process described above in connection with the discussion of block 282 of building a table of strongest candidates except the criteria is frequency and not magnitude. By limiting consideration of candidates to candidates which have relative speeds below that of the patrol speed, all opposite lane targets are automatically eliminated because they all have relative speeds above the patrol speed. The search of block 300 results in the selection of a fastest candidate not previously selected and subjected to qualification tests. Then the selected candidate is passed to the qualification tests, if any. The search of block 300 represents two classes of embodiments. The first class is one where multiple fastest candidates are selected for further qualification one by one until one qualifies or all candidates are exhausted. The second class of embodiments is characterized by selection of the single fastest candidate for subjecting to qualification tests, and, if it does not qualify, processing returns to Start to collect new data and start over.

Next, test 302 is performed representing the optional qualification of the fastest candidate using any number (including zero) of known fastest candidate qualification tests. It is preferred to have at least one qualification test in the form a maximum noise-to-signal ratio, and any number of the other qualification tests in any combination described in the STALKER DUAL™ dash mounted Doppler police traffic surveillance radar patent may be used to try to eliminate the fastest same lane candidate if it may be a false target. The most common qualification tests are to make sure the candidate is not 2nd or 3rd harmonic of patrol speed or other strong signals in the spectrum and is not an intermodulation product.

If the fastest candidate does not qualify, processing returns to Start in some embodiments or returns to step 300 to pick the next fastest candidate. If the fastest candidate qualifies, step 304 is performed to determine if the target that qualified came from the approaching or receding target spectrum. If it came from the approaching spectrum and test 306 on FIG. 13*i* indicates the front antenna has been selected, the target speed calculation and display of block 310 is performed. Block 310 represents the process of calculating and displaying the fastest target speed as equal to the patrol speed minus the qualified same lane fastest target's relative speed. The result can be displayed alone or, optionally, simultaneously with one or both of the strongest target speed and the patrol speed. This same process is carried out if the qualified same lane fastest target came from the receding spectrum and test 308 determines that the rear antenna has been selected.

If the qualified same lane fastest target came from the receding spectrum, and test 308 determines that the front antenna has been selected, the processing of block 312 is performed to calculate the fastest target's speed and display it. Block 312 calculates the fastest target speed by adding the patrol speed to the relative speed of the qualified same lane fastest target and displays it. Optionally, one or both of the patrol speed and the speed of the strongest same lane target previously located is simultaneously displayed. The processing of block 312 is also performed if the qualified same lane fastest target came from the approaching target spectrum and test 306 determines that the rear antenna is selected.

In all modes when a fastest target is displayed it is preferred to simultaneously display the patrol speed so the officer can verify its correctness and the strongest target speed to help the officer with his or her visual target identification and tracking history.

Alternative or Type Embodiment to Find Fastest Only or Strongest Only with Direction Sensing Referring to FIGS. 14A through 14M, there is shown a flowchart of an alternative process which may be implemented by the digital signal processor in any of the embodiments of FIGS. 1–4. This process provides a multimode, direction-sensing, digital complex FFT police Doppler radar with operator selectability of the type of search that is performed as between strongest target only or fastest target only in any of the stationary, moving opposite lane or moving same lane modes of operation.

This process is similar to but also substantially different in result and ease of use than the process of FIGS. 13A through 13M. Specifically, in the species within the genus represented by FIGS. 13A through 13M where simultaneous display of strongest and fastest targets is implemented, when an officer selects a fastest search, he or she also gets a strongest search which is performed before the fastest search and which either results in successful location of the strongest target or not. If no strongest target is located on a particular pass, processing returns to start and never reaches the fastest search. The fastest search is done only when a successful strongest search has been previously completed. The simultaneous display of the strongest and fastest target speeds is a substantially different result because it gives the officer a better set of information to corroborate his visual tracking history of the targets he sees on the road. Since no traffic ticket is valid without a visual tracking history which includes agreement between the visual observations and the radar displays, having a display of strongest and fastest helps the officer correctly identify which of the multiple targets he is observing corresponds to the fastest target display. This correlation is helped greatly by the fact that in the simultaneous fastest and strongest display species, when the fastest target gets close enough to the radar to become the strongest target, its speed switches over to the strongest display window. This helps the officer positively identify the fastest target. Identification of the vehicle which corresponds to the fastest target speed displayed when there are multiple targets out about 0.5 to 1.5 miles all going approximately the same speed is very difficult to do visually. However, with a simultaneous fastest and strongest display with the fastest target speed switching over to the strongest target window when the fastest car becomes the strongest target helps the officer identify the correct car.

This cannot be done in the subgenus of embodiments represented by FIGS. 14A through 14M. In the subgenus of processes represented by FIGS. 14A through 14M, all the blocks having reference numbers which are the same as blocks in FIGS. 13A through 13M represent the same processing steps and alternatives thereto. The difference is that in the subgenus of FIGS. 14A through 14M, there is a operator selection process that allows the operator to choose between strongest search only for a single strongest target or fastest search alone for a single fastest target and display of only the fastest target or only the strongest target so found. Such an operator selection is provided in each of the stationary, moving opposite lane and moving same lane modes.

Figure 14A:
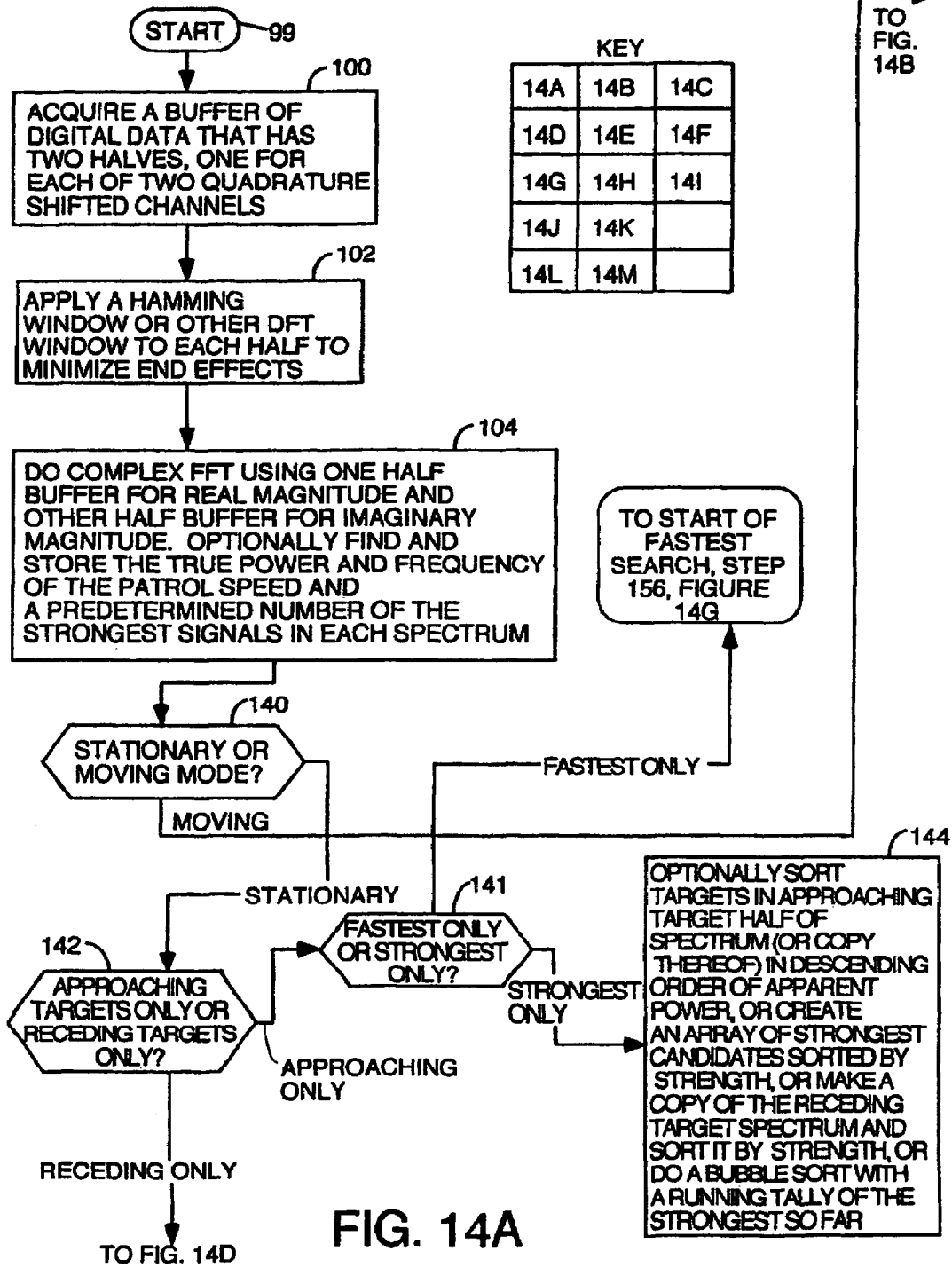

The first operator selection branching step is shown at 141 on FIG. 14A for the stationary mode. This block represents the DSP checking the position of a fastest selection switch on the front panel or a fastest/strongest flag stored in memory which is set when the operator operates a fastest switch on the front panel or a remote control indicating a fastest search is desired. If the flag is not set or the switch indicates that a strongest only search is desired, processing is vectored to step 144 which represents the beginning of a strongest search which is identical to the various embodiments for a strongest search previously described in FIGS. 13A through 13M. If the operator has indicated that a fastest only search is desired, processing is vectored to step 156 on FIG. 14G to start a fastest target only search which is similar to the fastest search of FIGS. 13A through 13M except for two differences. First, there is a difference with respect to step 158 symbolizing the resorting of the array by decreasing frequency down to the speed of the strongest target or other embodiments previously described wherein the fastest search is described as a top down search with a limit set at the speed of the previously located strongest target fastest search. In the fastest search of FIGS. 14A through 14M, there is no limit set at the speed of the strongest target. Thus, the fastest target can be the speed of the strongest target if there is only one target on the road.

Figure 14B:
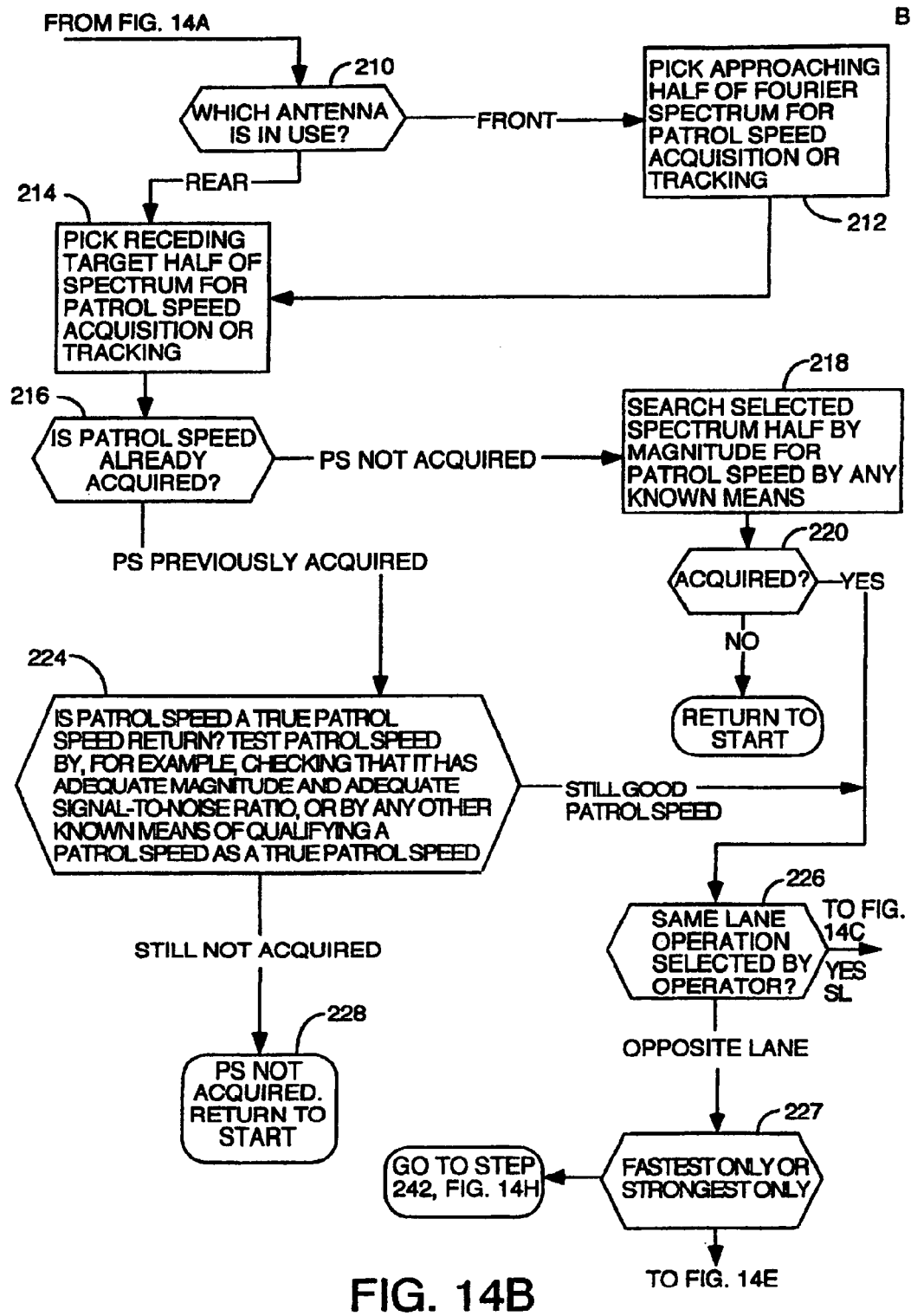
Figure 14C:
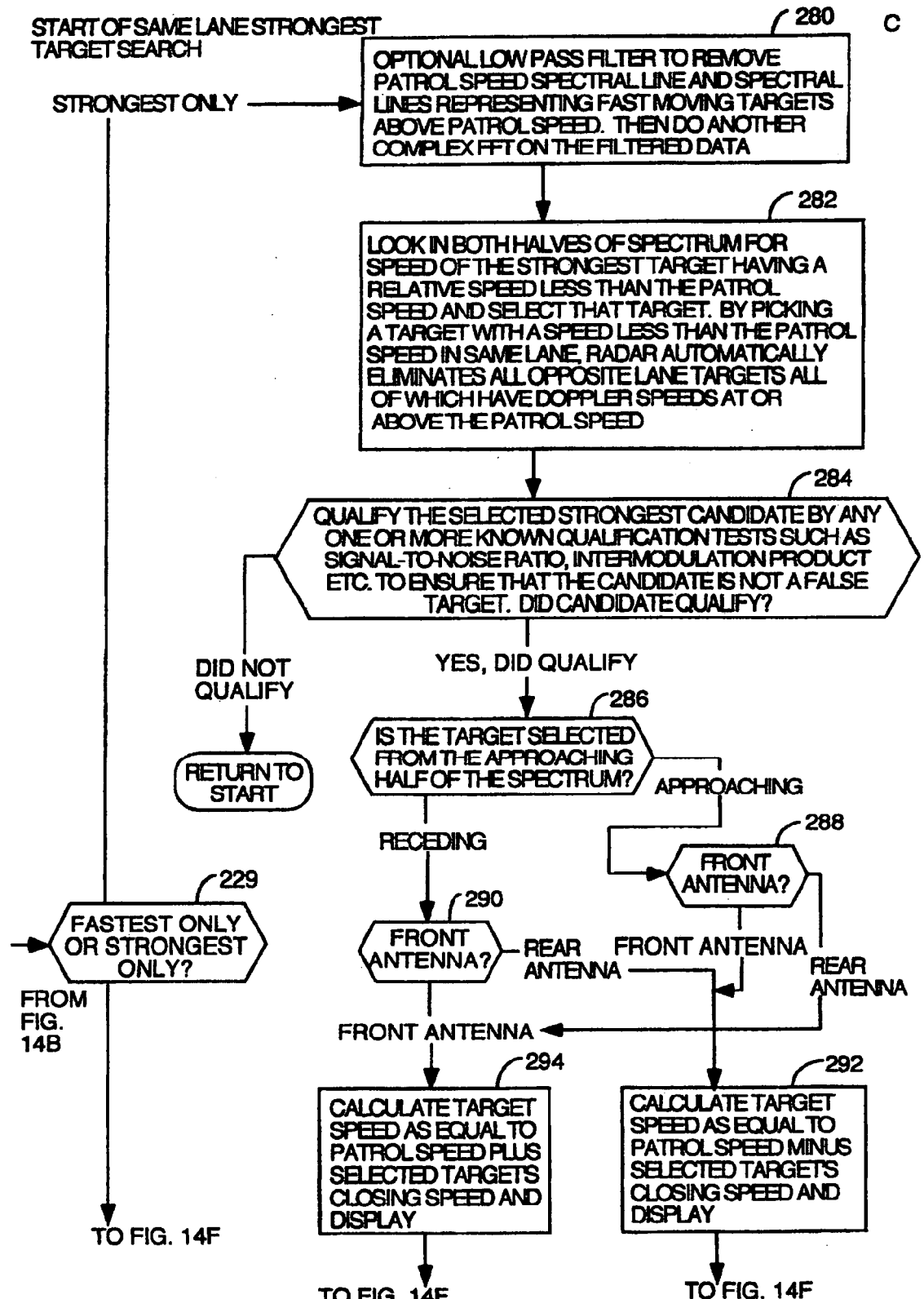
Figure 14D:
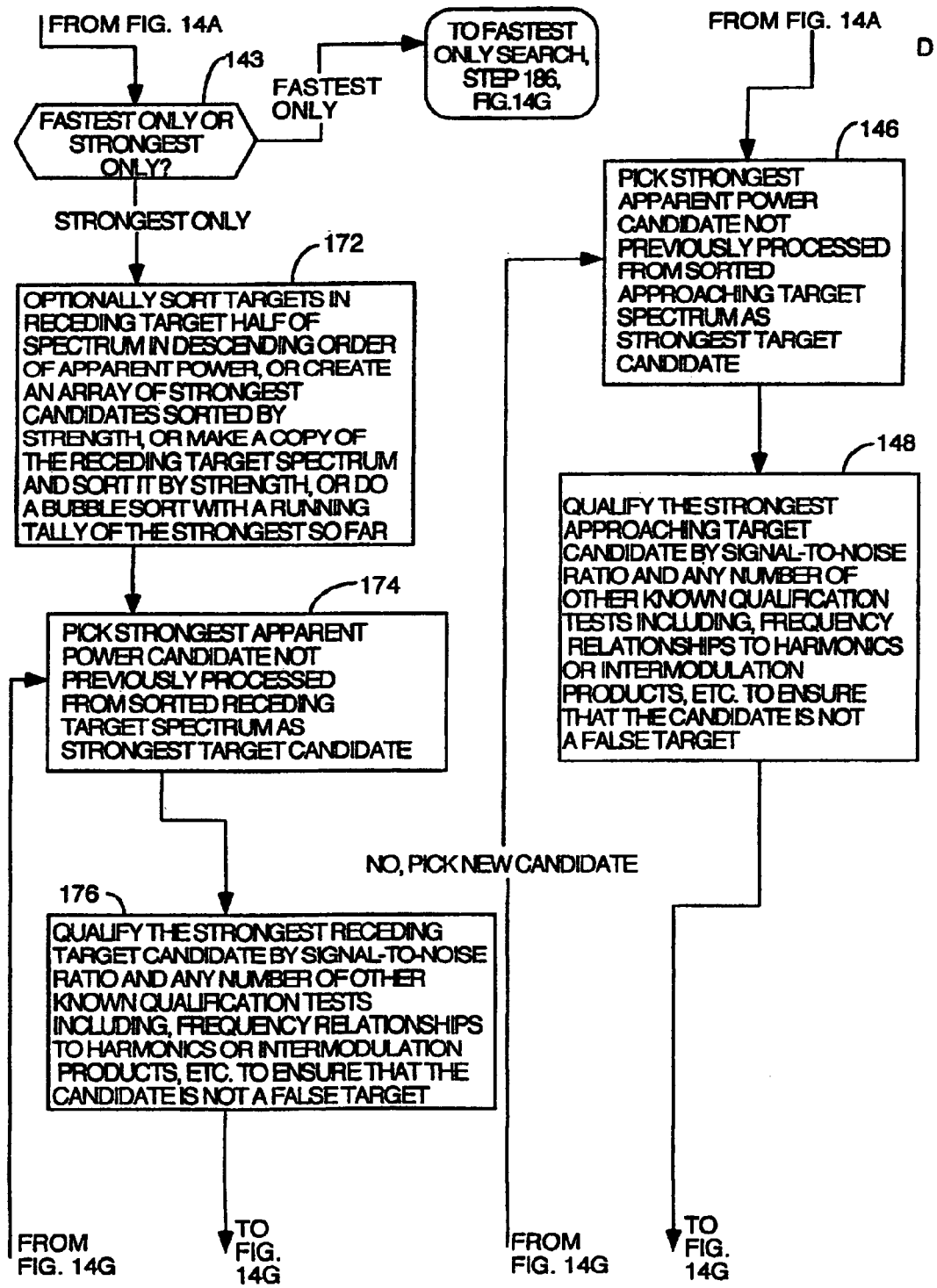
Figure 14E:
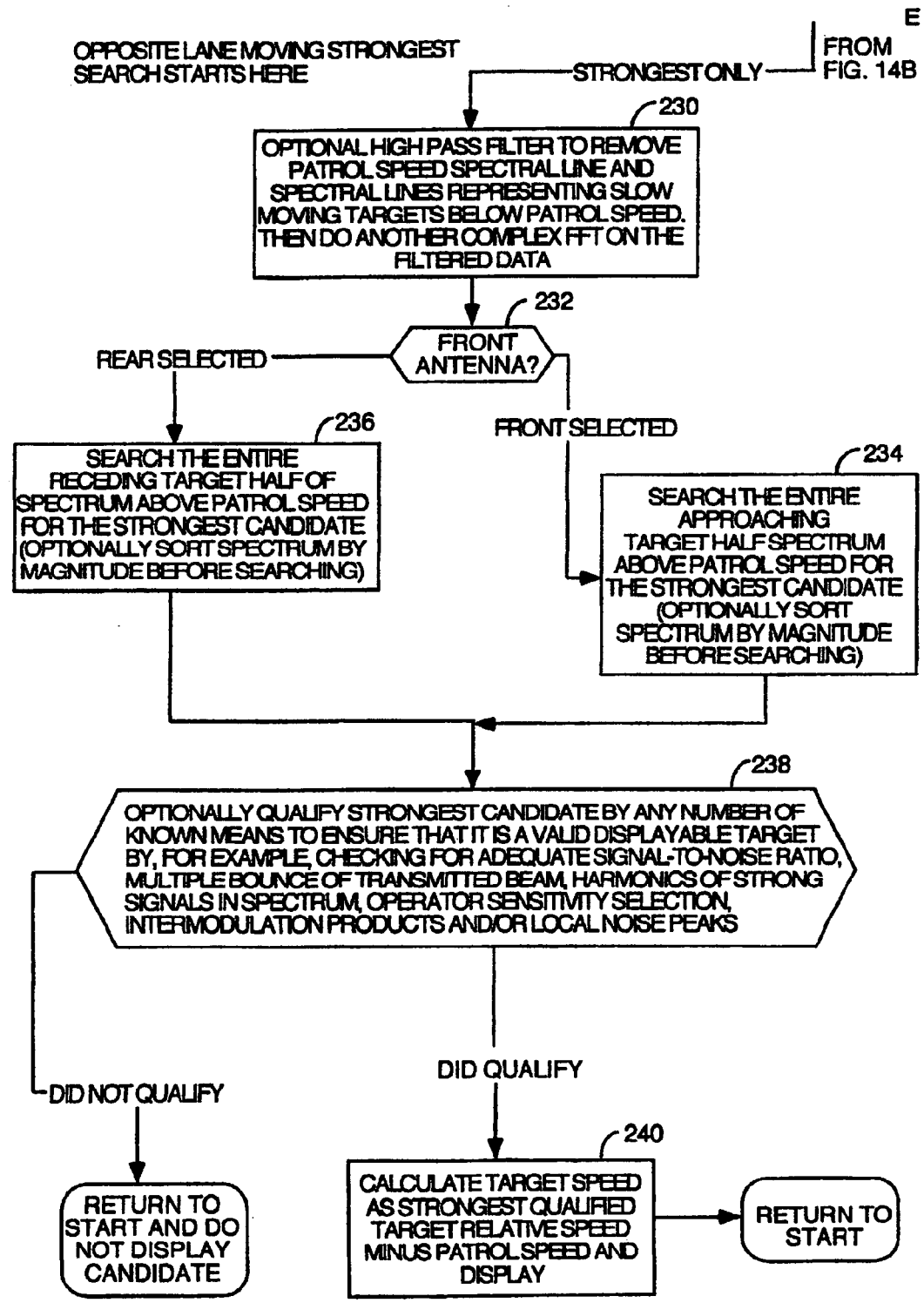
Figure 14F:
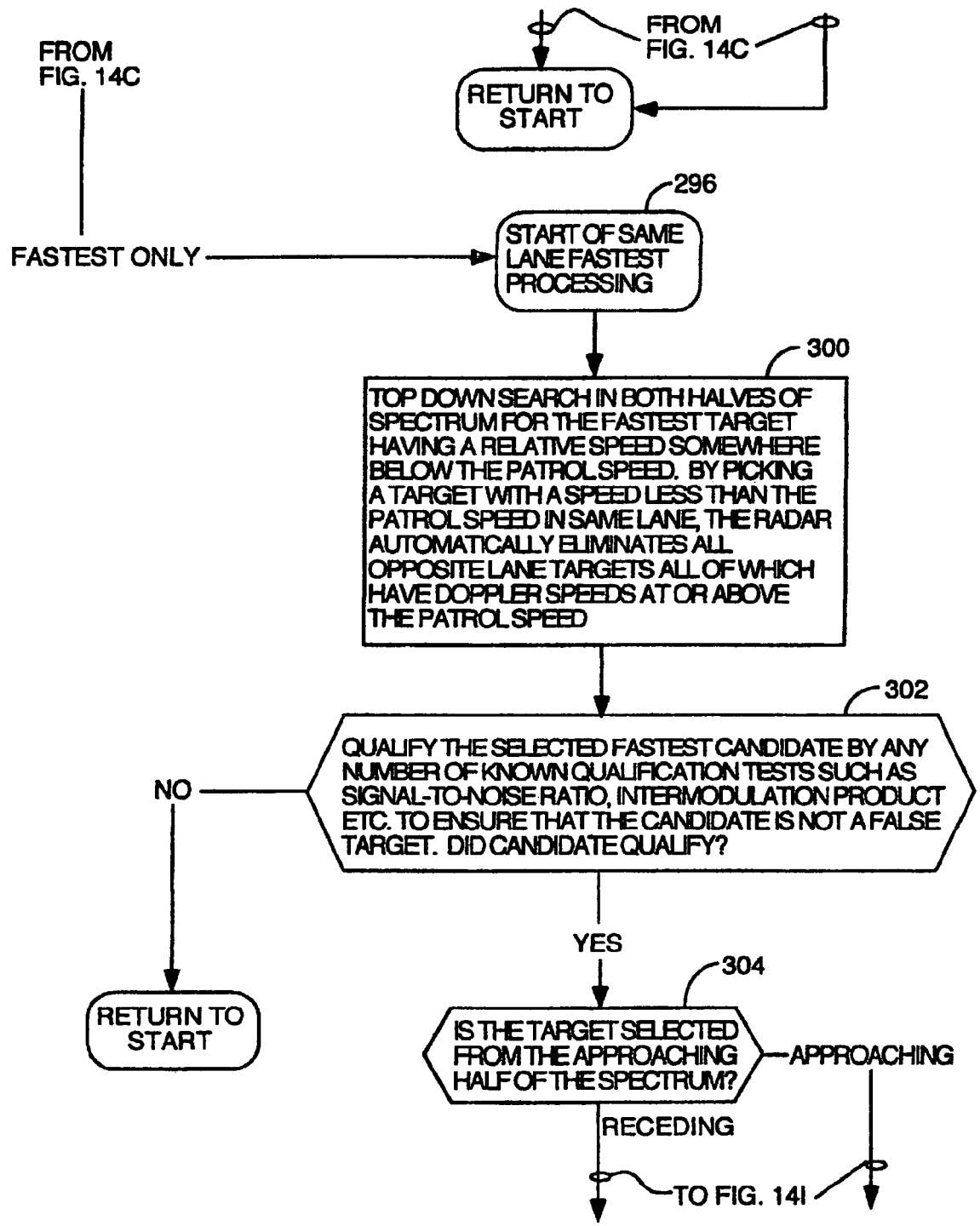
Figure 14G:
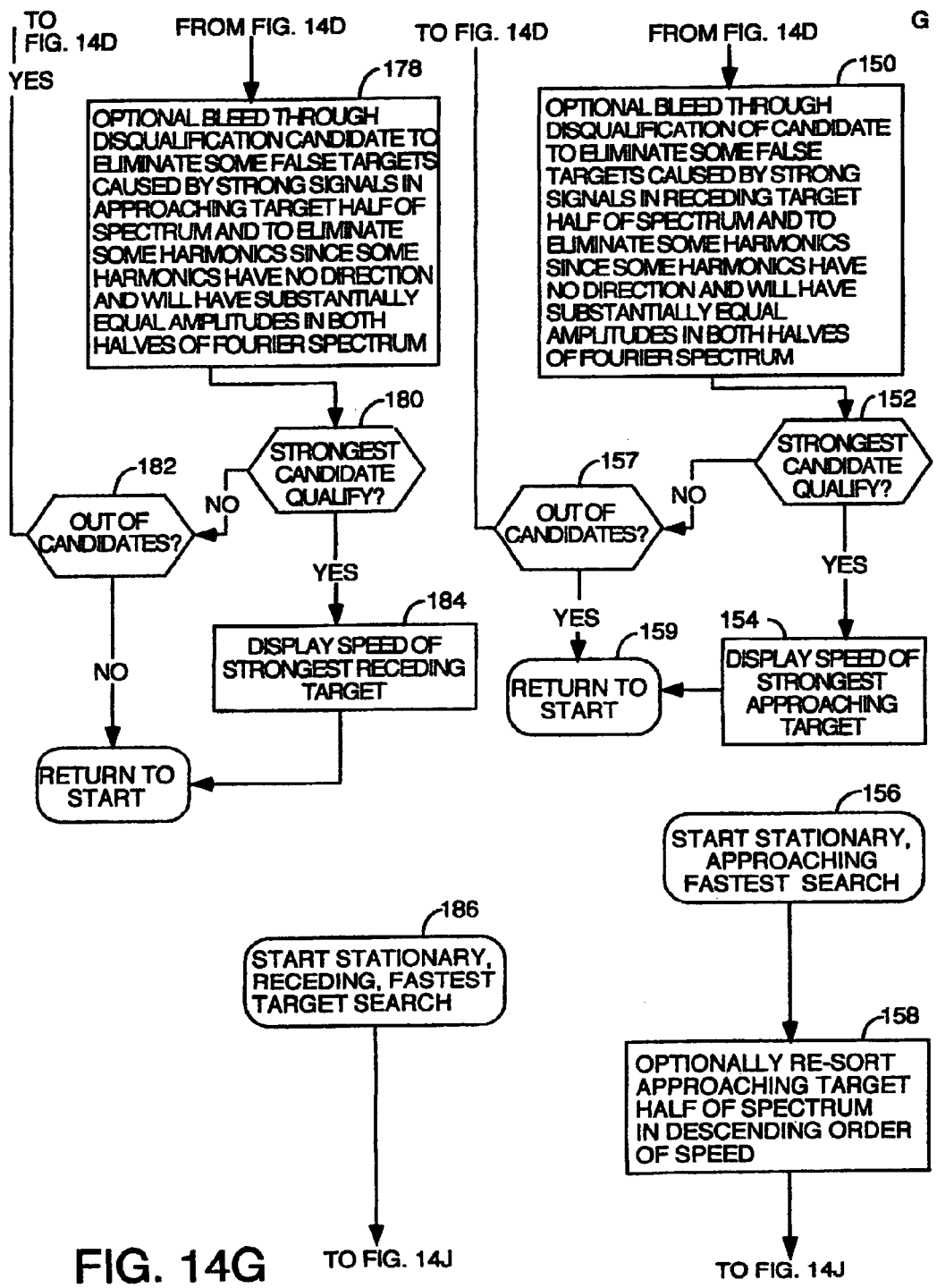
Figure 14H:
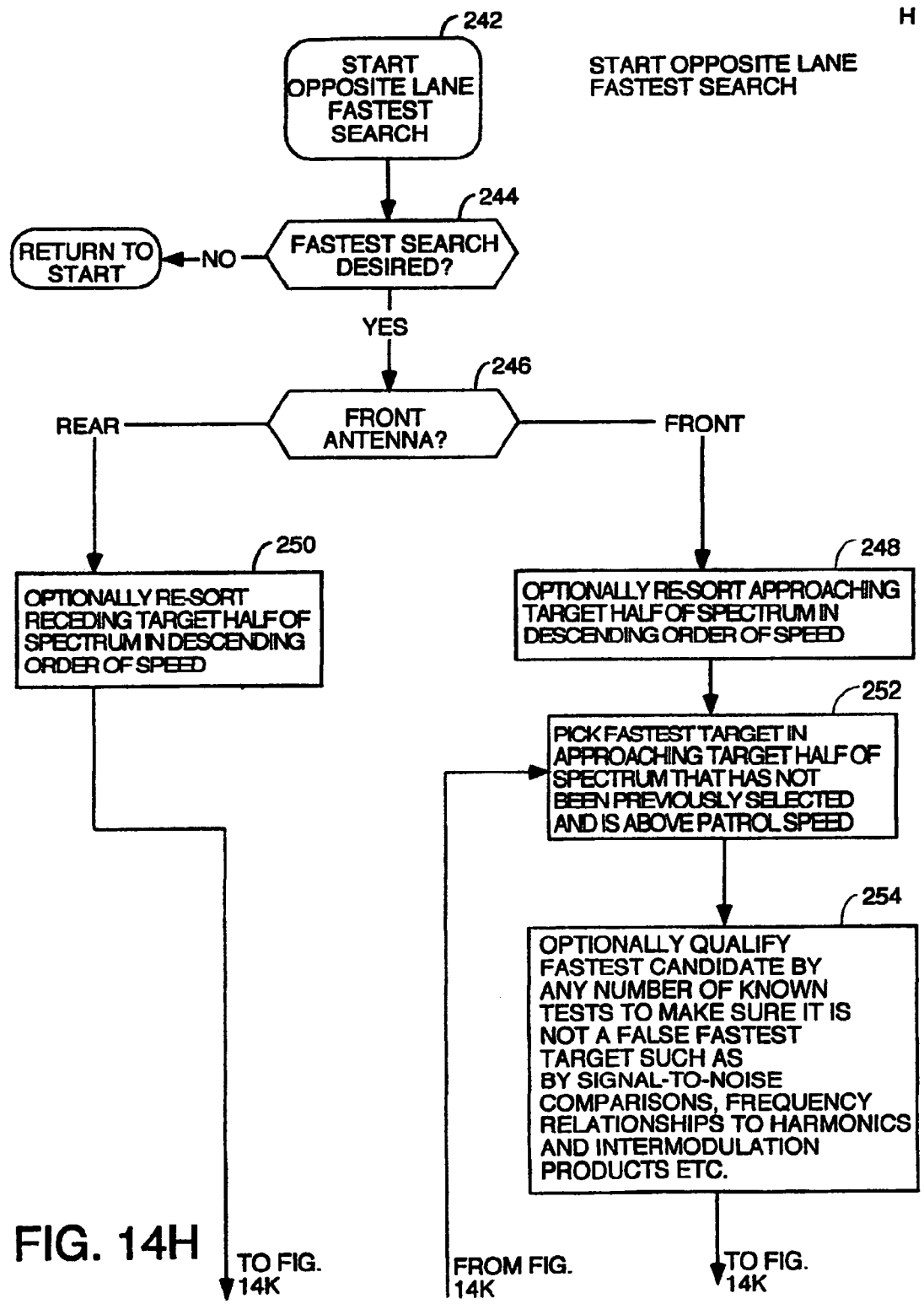
Figure 14I:
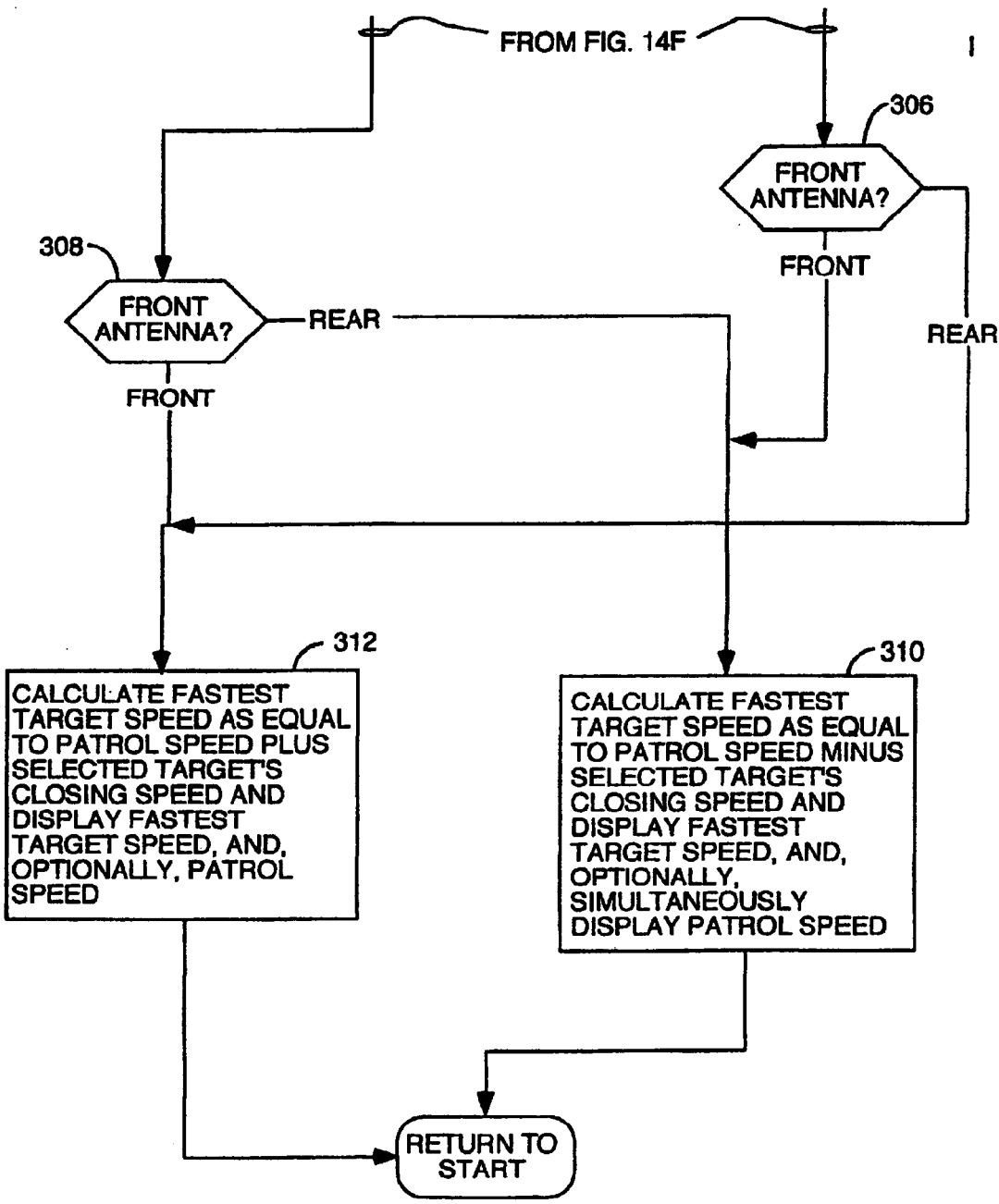
Figure 14J:
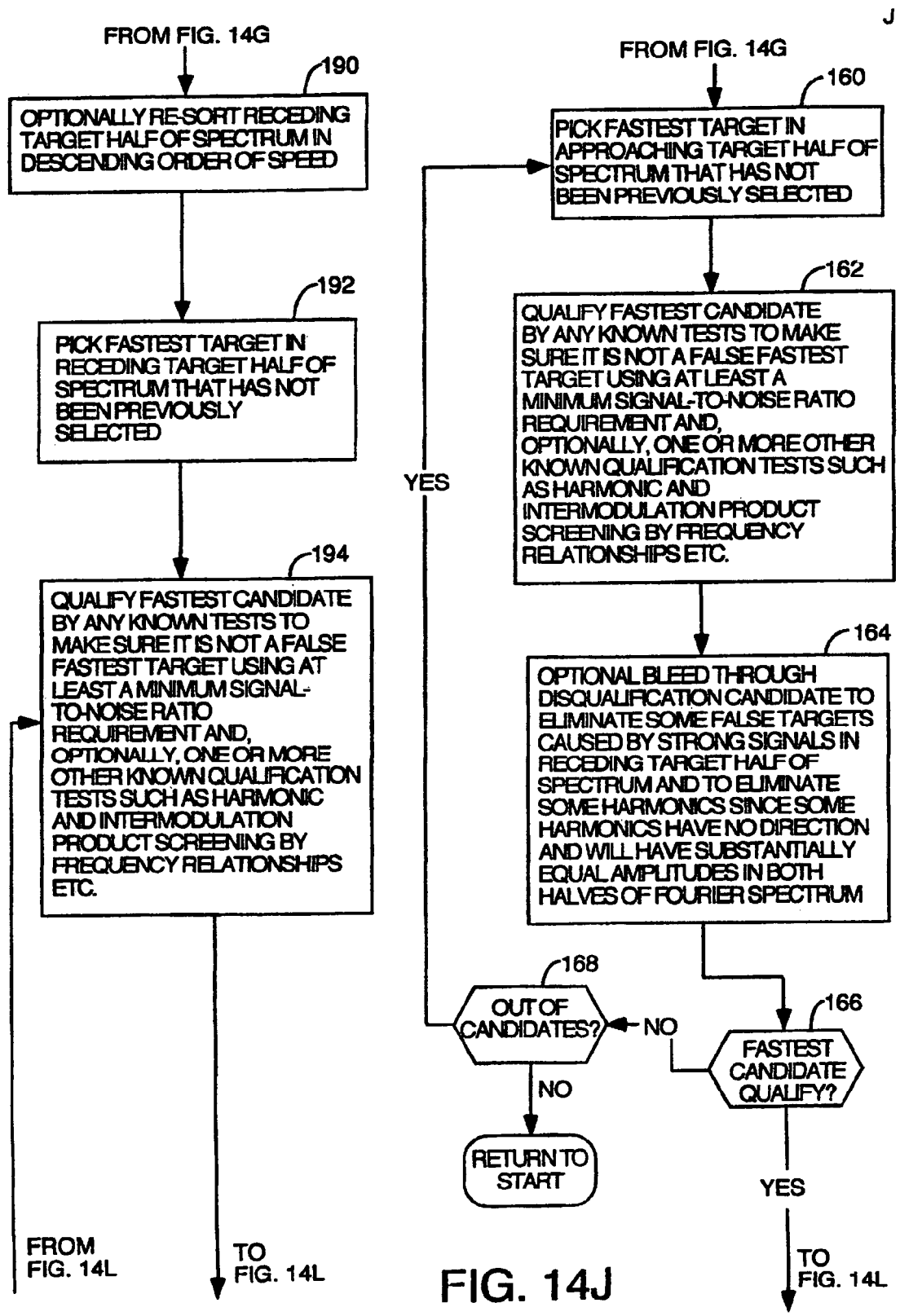
Figure 14K:
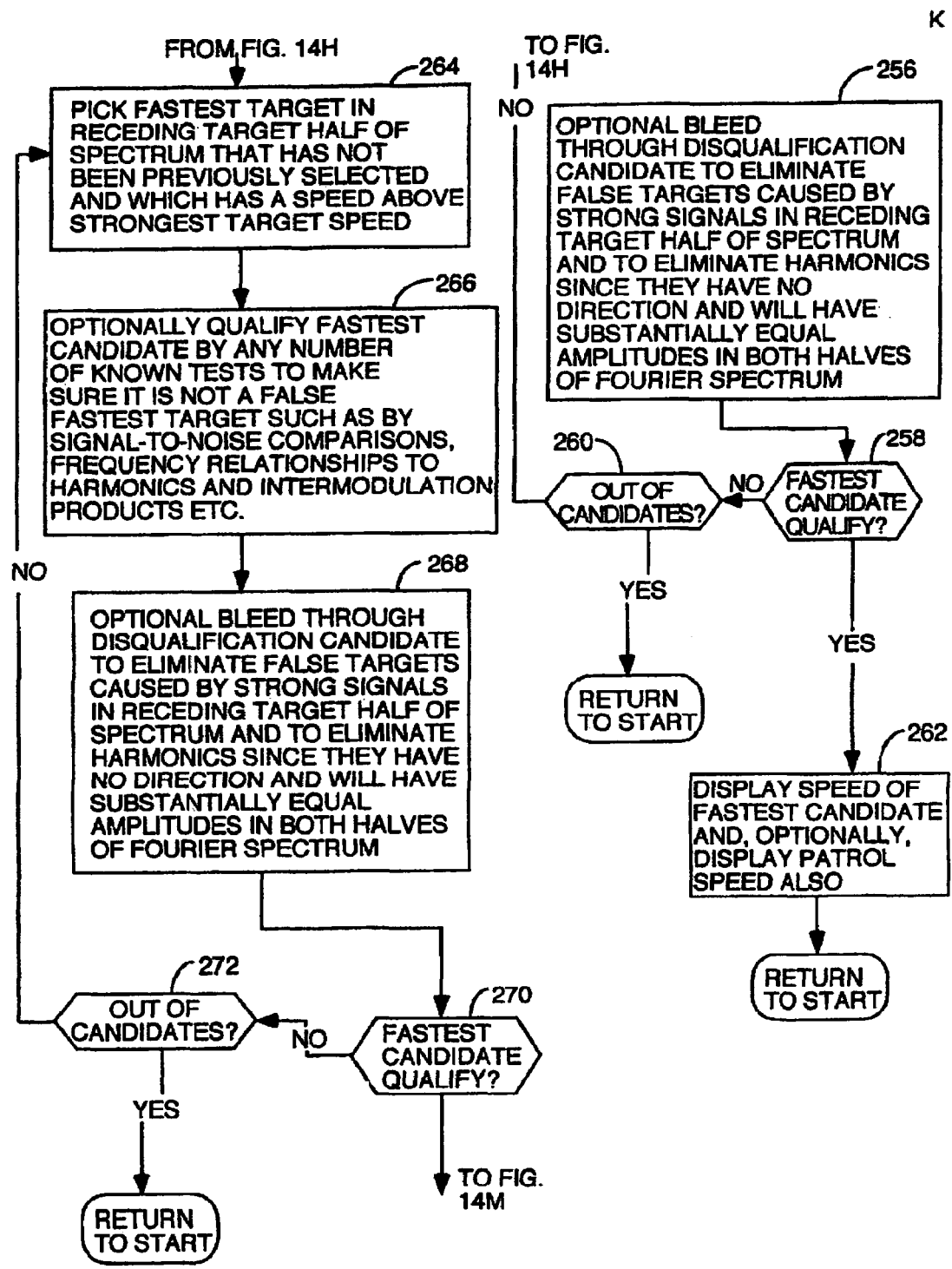
Figure 14L:
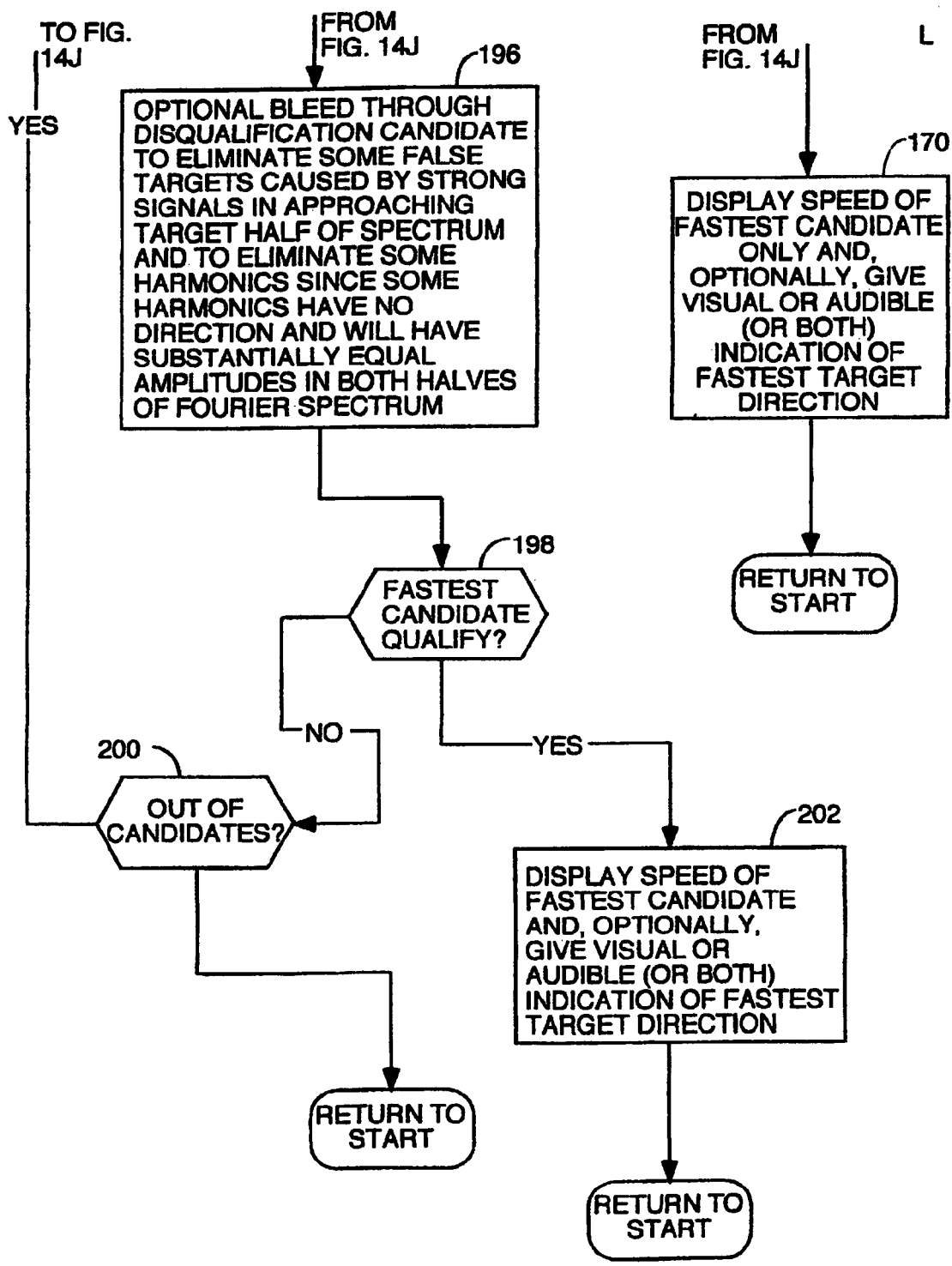

The second difference is in step 170 on FIG. 14L which symbolizes the process of displaying the fastest target only with no option of simultaneously displaying a strongest target.

Step 141 on FIG. 14A represents the fastest only/strongest only operator choice only for stationary mode, approaching targets only. If the operator chose receding targets only in step 142, the operator fastest/strongest choice is represented by block 143. If a strongest only choice has been made, processing is vectored to step 172 to start a strongest search which is identical to the strongest search in stationary receding targets only mode of FIGS. 13A through 13M. If a fastest only search has been selected, processing is vectored to step 186 on FIG. 14G to start a fastest target only search which is similar to the fastest search in stationary, receding target only mode described with reference to FIGS. 13A through 13M except for two differences. The differences are as previously described in that the fastest search is not limited to candidates having relative speeds above the strongest target speed (see step 190, FIG. 14J), and only the fastest target speed is displayed (see step 202, FIG. 14L).

In moving mode, if the operator chose opposite lane operation in step 226, the DSP reads the operator choice of fastest only or strongest only in step 227. If the operator chose strongest only, processing is vectored to the start of a strongest only, moving, opposite lane search which is identical to the strongest only, moving, opposite lane search described in FIGS. 13A through 13M. If the operator chose a fastest only search, processing is vectored to step 242 on FIG. 14H to start a fastest only, moving mode, opposite lane search which is identical to the fastest only, moving mode, opposite lane search described in FIGS. 13A through 13M except for two exceptions. Those exceptions are that the fastest search is not limited to candidates above the speed of the strongest candidate (see steps 248 and 250 on FIG. 14H), and only the fastest target's speed is displayed along with an optional display of the patrol speed (see steps 262 and 278 on FIGS. 14K and 14M, respectively).

If, in step, 226 on FIG. 14B, the operator chose same lane, moving operation, processing is vectored to test 229 on FIG. 14C representing the determination by the DSP of whether the operator has chosen the fastest only or strongest only searches. If strongest only was chosen, processing is vectored to step 280 on FIG. 14C where a strongest only, moving, same lane search is performed which is identical to the strongest only, moving, same lane search described with reference to FIGS. 13A through 13M. If the operator chose fastest only, processing is vectored to step 296 on FIG. 14F representing the start of a moving, same lane, fastest only search which is like the moving, same lane fastest search described in FIGS. 13A through 13M with two differences. Again, the differences are that the moving, same lane, fastest only search is not restricted in FIGS. 14A through 14M to candidates having speeds above the strongest target speed (step 300, FIG. 14F), and only the fastest target speed is displayed along with an optional display of the patrol speed (steps 310 and 312).

Although the invention has been described in terms of the preferred and alternative embodiments described herein, those skilled in the art will appreciate other changes, alterations and alternatives that do not depart from the spirit of the teachings of the invention. All such changes, alterations or alternatives are intended to be included within the scope of the claims appended hereto.

The invention claimed is:

1. Traffic surveillance radar apparatus having directional sensing and indication capability, comprising:
    an antenna assembly for (a) transmitting radar waves of given oscillator frequency toward moving traffic targets that are both approaching and receding from said radar apparatus, (b) receiving radar waves reflected from said moving traffic targets, and (c) generating Doppler shifted RF signals representative of said received radar waves;
    a mixer assembly, comprising first and second mixers with phase shift means coupled between said first and second mixers, for mixing signals having the said oscillator frequency with said Doppler shifted RF signals to respectively produce first and second sets of signals at the outputs of said first and second mixers, said first and second sets of signals including Doppler signals having a frequency equal to the difference between said oscillator frequency and said Doppler shifted RF signals;
    means for converting said first and second sets of Doppler signals into digital samples; and
    a digital signal processor programmed to (a) perform a fast Fourier transform on said digital samples, to determine therefrom the speed of selected ones of said moving targets and the direction of travel whether said selected ones of said moving targets are approaching or receding from said radar apparatus, and (b) display the speed of at least one of the selected ones of said moving targets and an indication of the direction of travel of the target having the displayed speed.

2. The apparatus of claim 1 wherein said digital signal processor is further programmed to display, in response to operator command, selected ones of the moving targets only approaching said radar or only receding from said radar, or both approaching and receding from said radar.

3. The apparatus of claim 1 wherein said digital signal processor is programmed to simultaneously display the speed of the strongest target along with the display of the speed of one of the targets traveling faster than the strongest target.

4. A process carried out by traffic surveillance radar apparatus capable of determining the speed of moving traffic targets and the relative direction of said moving traffic targets relative to said radar apparatus, comprising:
    (a) transmitting radar waves of a given frequency toward at least moving targets approaching and receding from the radar apparatus;
    (b) receiving radar waves reflected from said moving traffic targets and generating Doppler shifted RF signals representative of said received radar waves;
    (c) mixing a signal of said given frequency with said Doppler shifted RF signals in a first mixer to generate, in a first channel, a first set of signals at the output of said first mixer, the output signals from said first mixer including Doppler signals having a frequency equal to the difference between said given frequency and said Doppler shifted RF signals;
    (d) mixing a signal of said frequency with said Doppler shifted RF signals in a second mixer to generate, in a second channel, a second set of signals at the outputs of said second mixer, the output signals from said second mixer including Doppler signals having a frequency equal to the difference between said given frequency and said Doppler shifted RF signals, in which either the signal of given frequency or the Doppler shifted RF signals supplied to the second mixer are shifted in phase relative to the phase of the signal of given frequency or the Doppler shifted RF signal, respectively, that are supplied to said first mixer;

(e) converting said first and second sets of Doppler signals in to digital samples;

(f) performing a fast Fourier transform on said digital samples to determine therefrom the speed of selected ones of said moving targets as well as the direction of travel of said moving targets with respect to said radar apparatus; and (g) displaying the speed of at least one of the selected ones of said moving target as well as and indication of the direction of travel of the target having the displayed speed.

5. Traffic surveillance radar apparatus having directional sensing and indication capability, comprising:

an antenna assembly for (a) transmitting radar waves of given oscillator frequency toward moving traffic targets that are both approaching and receding from said radar apparatus, (b) receiving radar waves reflected from said moving targets, and (c) generating Doppler shifted RF signals representative of said received radar waves;

a mixer assembly, comprising a phase shifter, for mixing signals having the said oscillator frequency with said Doppler shifted RF signals to respectively produce first and second sets of signals respectively including first and second sets of Doppler signals having a frequency equal to the difference between said oscillator frequency and said Doppler shifted RF signals, the first and second sets of Doppler signals being phase shifted by the phase shifter with respect to one another;

analog-to-digital converter for converting said first and second sets of Doppler signals into digital samples; and a digital signal processor programmed to (a) perform a fast Fourier transform on said digital samples to develop an approaching target Fourier spectrum and a receding target Fourier spectrum and determine therefrom the speed of selected ones of said moving targets and whether said moving targets are approaching or receding from said radar apparatus, and (b) indicate to the user of the radar apparatus the speed of at least one of the selected ones of said moving targets and direction of travel of the target having such speed.

6. A process carried out by traffic surveillance radar apparatus capable of determining the speed of moving traffic targets and the relative direction of travel of said moving traffic targets as approaching or receding from said radar apparatus, comprising:

(a) transmitting radar waves of a given frequency in a direction to engage moving traffic targets to be respectively approaching and receding from said radar apparatus;

(b) receiving radar waves reflected from said moving traffic targets and generating Doppler shifted RF signals representative of said received radar waves;

(c) generating a first set of signals which include Doppler signals having a frequency equal to the difference between said given frequency and said Doppler shifted RF signals;

(d) generating a second set of signals which include Doppler signals having a frequency equal to the difference between said given frequency and said Doppler shifted RF signals, but which are shifted in phase relative to the phase of the first set of signals;

(e) converting said first and second sets of signals into digital samples;

(f) performing a Fourier transform on said digital samples to develop an approaching target Fourier spectrum and a receding target Fourier spectrum to determine therefrom the speed of selected ones of said moving targets as well as the approaching or receding direction of travel of said moving targets with respect to said radar apparatus; and (g) indicating to the user of the radar apparatus the speed of at least one of the selected ones of said moving targets as well as whether the direction of travel of the target having such speed is approaching or receding from said radar apparatus.

7. A radar subsystem comprising:

an antenna;

a local oscillator having an output;

a duplexer coupled to said antenna, said local oscillator output and to a quadrature mixer input, to guide outgoing radar signals from the local oscillator to said antenna and guide reflected radar signals received by said antenna to a quadrature mixer input;

a quadrature mixer having received signal input coupled to said quadrature mixer input and having a local oscillator input, and having channel A and channel B outputs, said quadrature mixer functioning to mix local oscillator energy received at said local oscillator input with reflected radar signals received at said quadrature mixer input in first and second mixers, said first mixer having an output coupled to said channel output and said second mixer having an output coupled to said channel B output, each mixer having an input coupled to said local oscillator input and having a second input coupled to said quadrature mixer input, said first and second mixers generating quadrature output signals at said channel A and channel B outputs by either shifting the phase in any way of the local oscillator signal applied to one mixer by some integer multiple of 90 degrees relative to the local oscillator signal applied to the other mixer, or shifting the phase in any way of the reflected radar signals applied to one mixer relative to the other mixer and coupling to resulting outputs of said channel A and channel B outputs; and at least one probe coupled to said local oscillator output and coupled to said local oscillator input of said quadrature mixer so as to supply local oscillator energy thereto:

first and second analog-to-digital converters coupled to digitize the output signals appearing at said channel A and channel B outputs; and a digital signal processor programmed to perform a fast Fourier transform on said digital samples to generate a Fourier spectrum.

8. The apparatus of claim 7 further comprising matched amplifiers amplifying the signals at said channel A and channel B outputs and coupling the amplified signals to analog signal inputs of said first and second analog-to-digital converters, and wherein said first and second analog-to-digital converters are matched.

9. The apparatus of claim 8 further comprising matched gain control circuitry coupled to each of said channel A and channel B inputs.

10. The apparatus of claim 9 further comprising matched gain control circuitry coupled to each of said channel A and channel B inputs, and wherein the gain of said automatic gain control circuits is controlled by one or more signals from said digital signal processor.

11. The apparatus of claim 7 further comprising a display and switches coupled to said digital signal processor, and wherein said digital signal processor is programmed to receive user inputs from said switches governing which search mode to use and is programmed to perform searching in a predetermined number of different modes including the ability to search for targets selected only from the class of targets which have relative velocities approaching the radar or targets selected only from the class of targets having relative velocity receding from the radar.

12. The apparatus of claim 11 wherein said digital signal processor is programmed to have search modes in which fastest targets can be found in either the class of targets with approaching relative velocities or receding relative velocities and their speed displayed.

* * * * *